(12) United States Patent
Halleck et al.

(10) Patent No.: US 9,910,809 B2
(45) Date of Patent: Mar. 6, 2018

(54) HIGH PERFORMANCE INTERCONNECT LINK STATE TRANSITIONS

(71) Applicant: Intel Corporation, Santa Clara, CA (US)

(72) Inventors: William R. Halleck, Lancaster, MA (US); Rahul Shah, Marlborough, MA (US); Venkatraman Iyer, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 434 days.

(21) Appl. No.: 14/578,175

(22) Filed: Dec. 19, 2014

(65) Prior Publication Data

US 2016/0179730 A1 Jun. 23, 2016

(51) Int. Cl.
*G06F 13/40* (2006.01)
*G06F 13/42* (2006.01)

(52) U.S. Cl.
CPC ...... *G06F 13/4027* (2013.01); *G06F 13/4282* (2013.01)

(58) Field of Classification Search
CPC .................. G06F 13/4027; G06F 13/4282
See application file for complete search history.

(56) References Cited

U.S. PATENT DOCUMENTS

| | | | |
|---|---|---|---|
| 2011/0002311 A1* | 1/2011 | Wang | H04H 20/67 370/336 |
| 2013/0041934 A1* | 2/2013 | Annamalaisami | H04L 43/026 709/203 |
| 2014/0281753 A1* | 9/2014 | Wagh | G06F 13/4295 714/56 |
| 2015/0205741 A1* | 7/2015 | Iyer | G06N 99/005 710/104 |
| 2015/0213099 A1* | 7/2015 | Rinke | G06F 17/30575 707/634 |

* cited by examiner

*Primary Examiner* — Nimesh G Patel
(74) *Attorney, Agent, or Firm* — Alliance IP, LLC

(57) ABSTRACT

A supersequence is sent to another device to indicate a transition from a partial width link state to another active link state. The supersequence is to be sent over one or more lanes of a link and is to include at least a portion of a start of data sequence (SDS) to include a predefined sequence and a byte number value. The byte number value is to indicate a number of bytes measured from a preceding control interval.

24 Claims, 21 Drawing Sheets

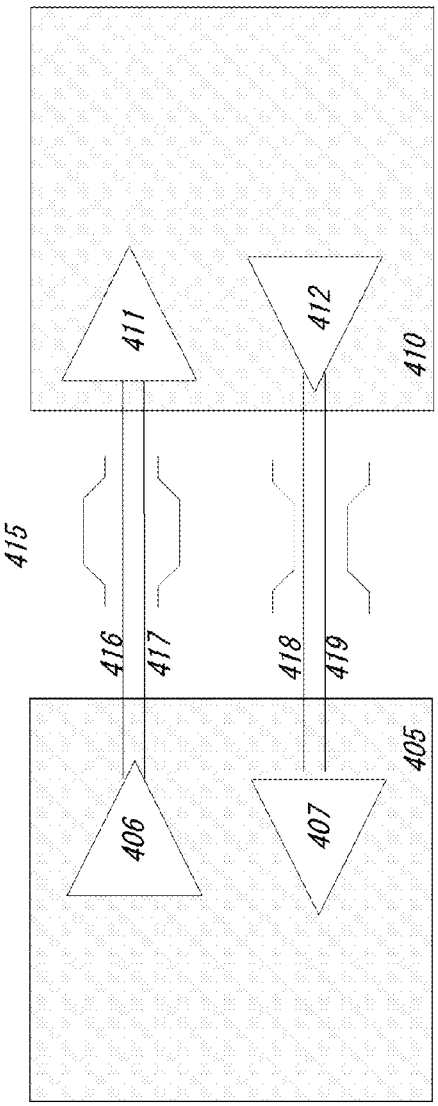

DETECT  ⌒905

| EIEOS | TS 0 | TS 1 | TS 2 | TS 3 | ..... | TS 6 | ~1KUI |

POLLING/CONFIG/LOOPBACK  ⌒910

| EIEOS | TS 0 | TS 1 | TS 2 | TS 3 | ..... | TS 30 | ~4KUI |

PARTIAL WIDTH TRANSMITTING STATE EXIT  ⌒915

| EIEOS | | | | | | | |
| EIEOS | FTS 0 | FTS 1 | FTS 2 | FTS 3 | ..... | FTS 6 | ~1KUI |
| EIEOS | FTS | FTSe | SDSp | FTSp | | | |

FIG. 9

| Byte | Description |
|---|---|
| 0 | 0xE1 |
| 1-12 | 0xAA |
| 13-15 | BNb.BN<br>(BN = 12-bit byte number as measured from previous L0c; BNb is bit-wise complement of BN) |

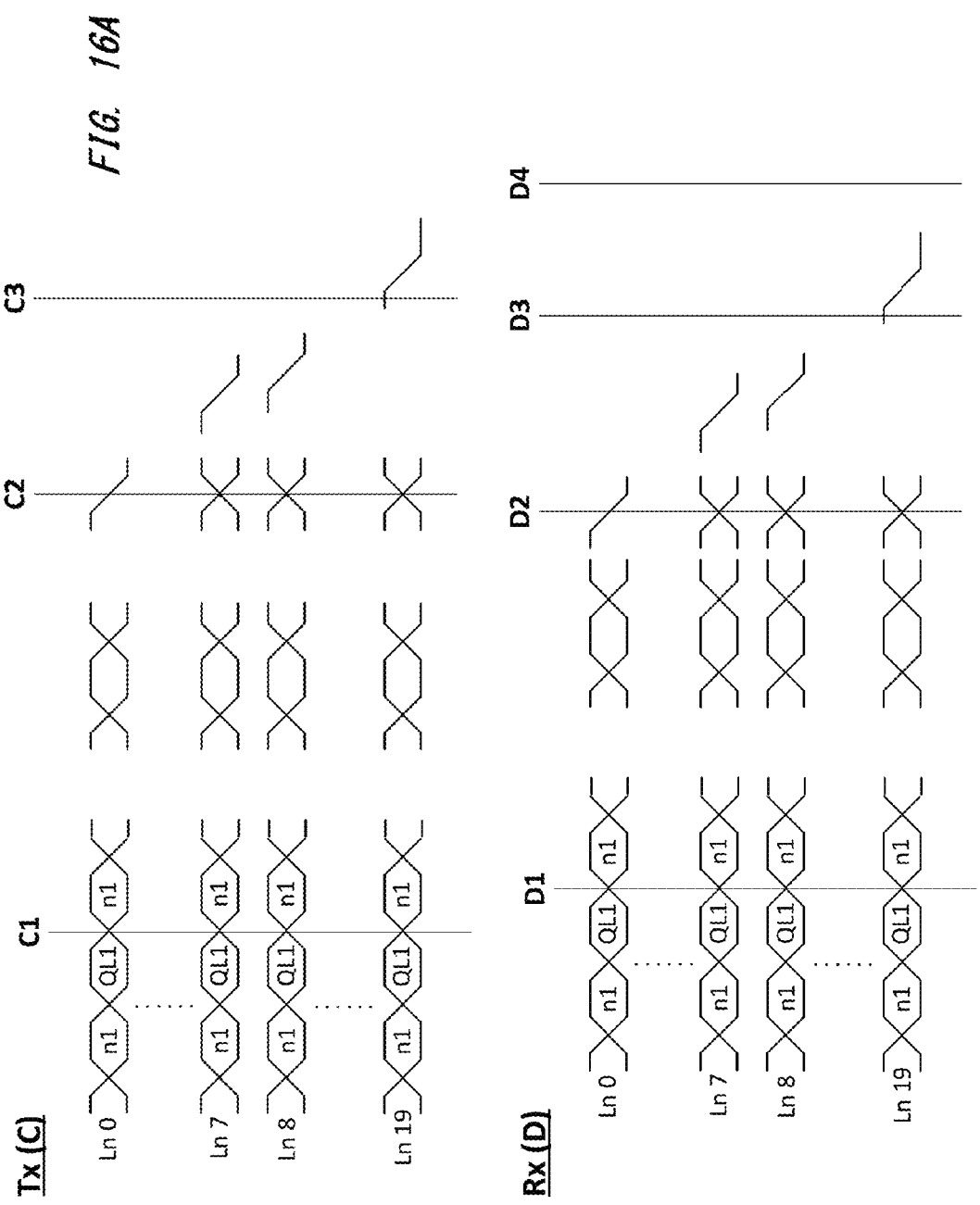

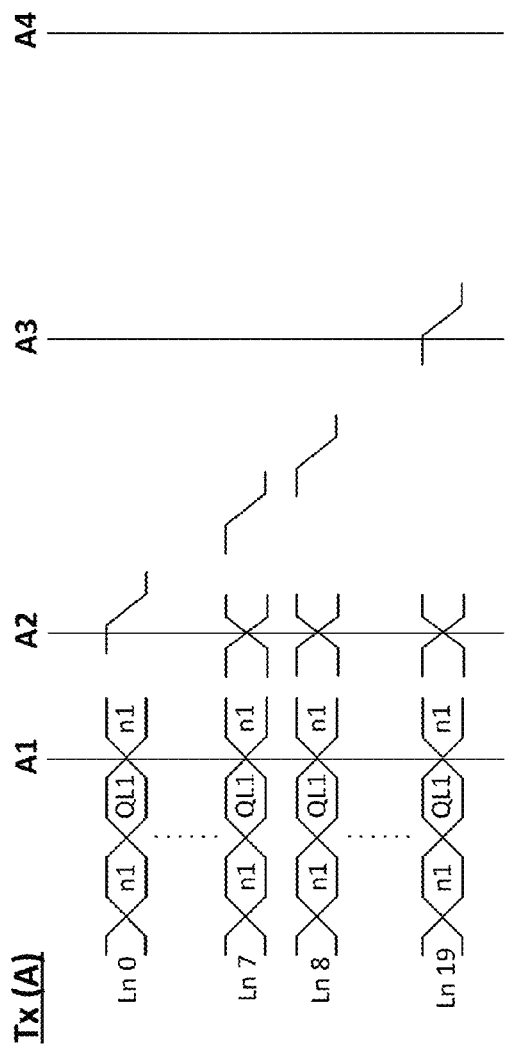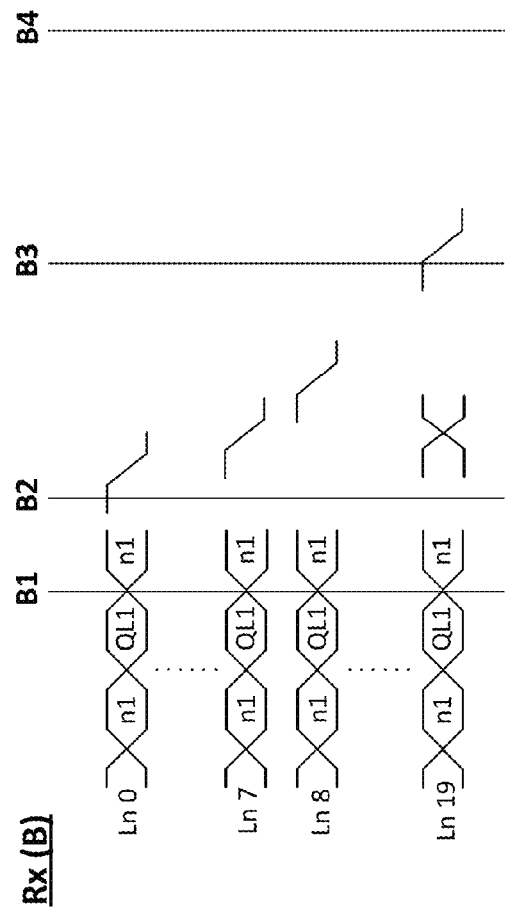
FIG. 16B

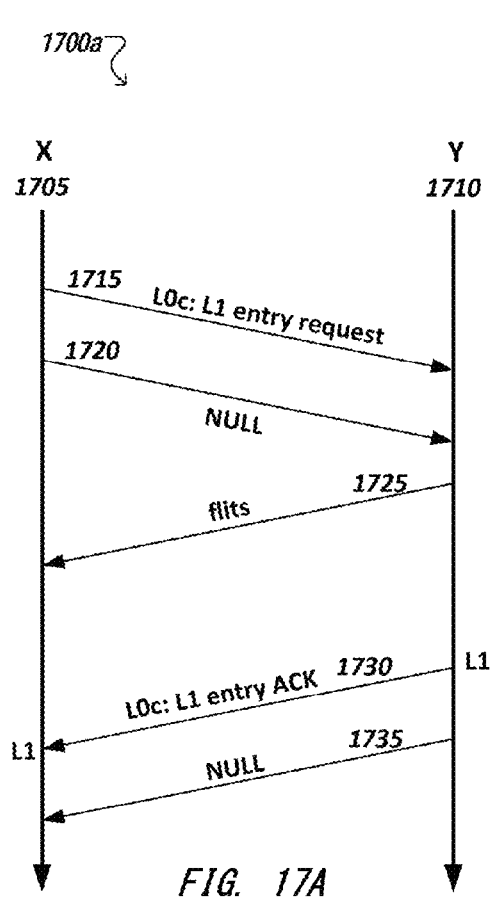
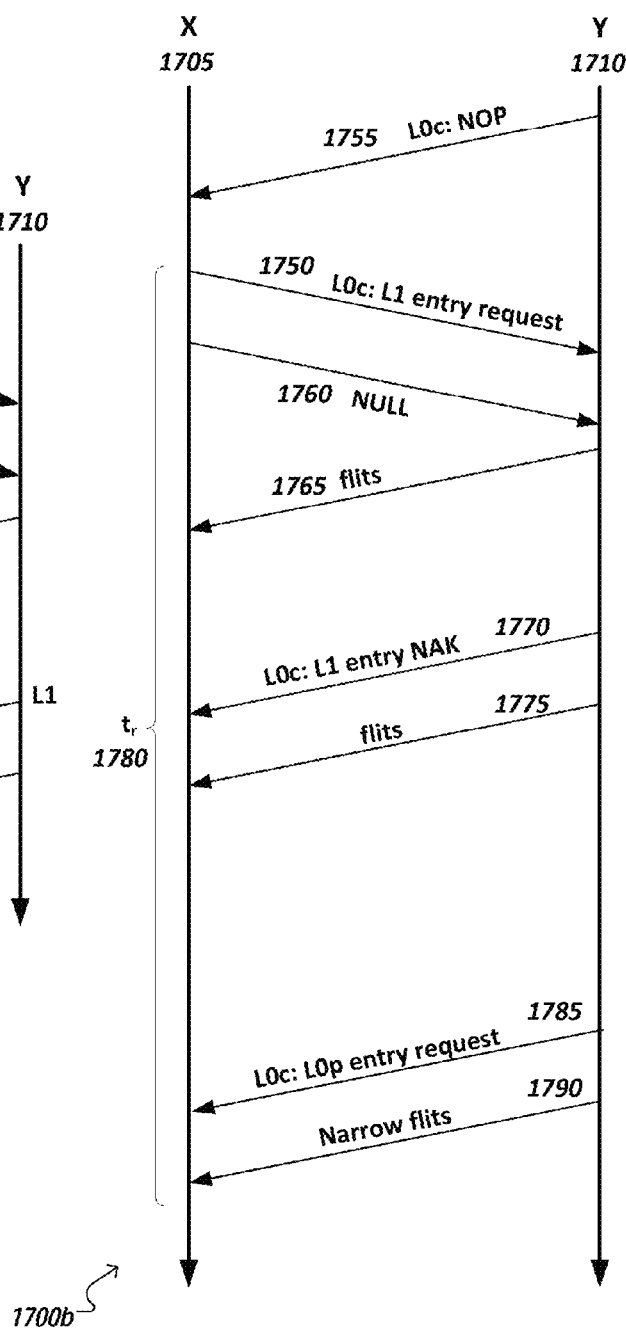
FIG. 17A
FIG. 17B

HIGH PERFORMANCE INTERCONNECT LINK STATE TRANSITIONS

FIELD

The present disclosure relates in general to the field of computer communications, and more specifically, to an input/output hardware architecture.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIG. 3 illustrates an embodiment of a transaction descriptor.

FIG. 4 illustrates an embodiment of a serial point-to-point link.

FIG. 9 illustrates example control supersequences.

FIGS. 16A-16B illustrate an example transition to a low power link state.

FIGS. 17A-17B illustrate interactions between two devices coupled by a link.

Like reference numbers and designations in the various drawings indicate like elements.

DETAILED DESCRIPTION

Figure 1:
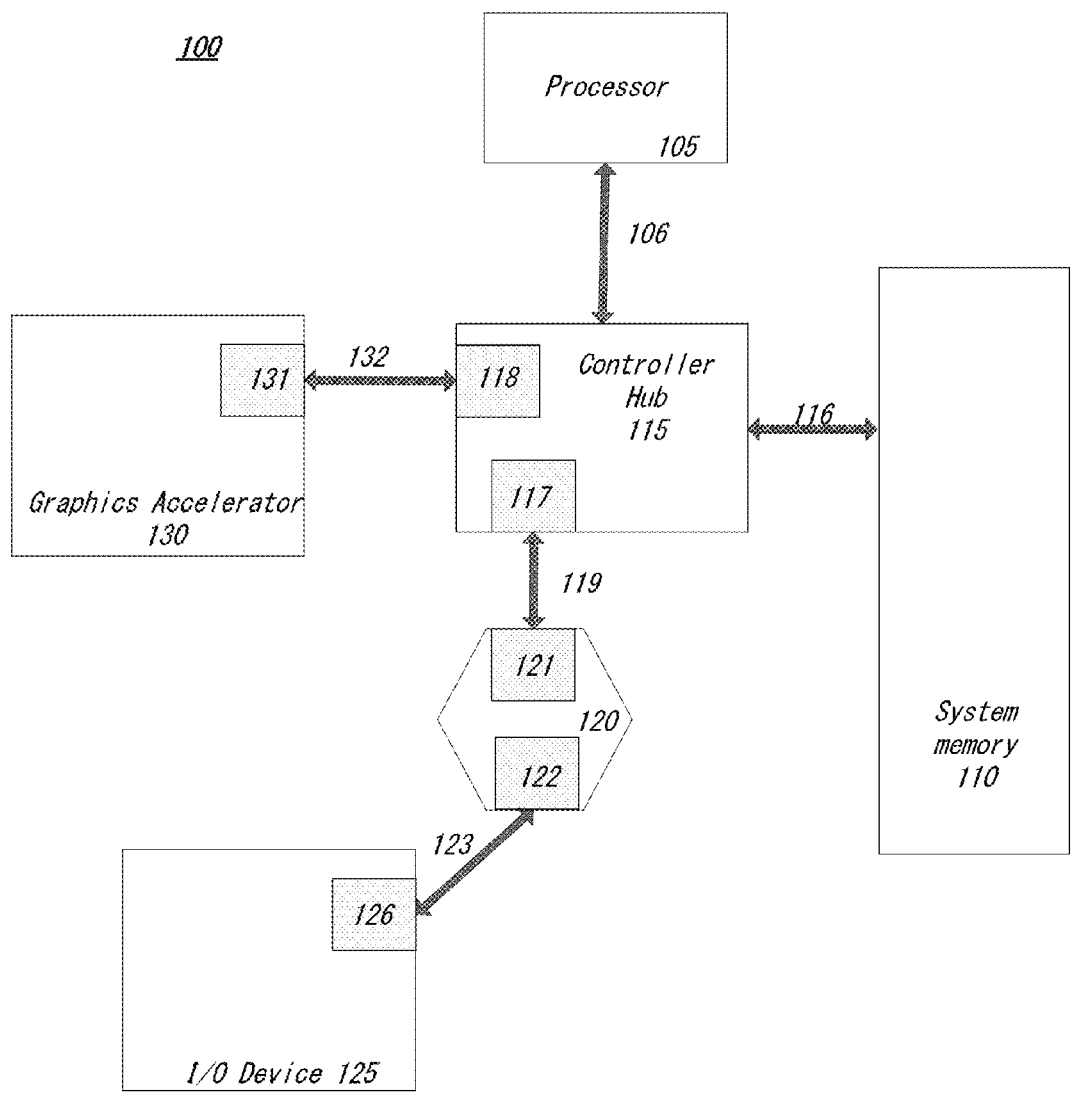
FIG. 1 illustrates a simplified block diagram of a system including a serial point-to-point interconnect to connect I/O devices in a computer system in accordance with one embodiment.

In the following description, numerous specific details are set forth, such as examples of specific types of processors and system configurations, specific hardware structures, specific architectural and micro architectural details, specific register configurations, specific instruction types, specific system components, specific processor pipeline stages, specific interconnect layers, specific packet/transaction configurations, specific transaction names, specific protocol exchanges, specific link widths, specific implementations, and operation etc. in order to provide a thorough understanding of the present invention. It may be apparent, however, to one skilled in the art that these specific details need not necessarily be employed to practice the subject matter of the present disclosure. In other instances, well detailed description of known components or methods has been avoided, such as specific and alternative processor architectures, specific logic circuits/code for described algorithms, specific firmware code, low-level interconnect operation, specific logic configurations, specific manufacturing techniques and materials, specific compiler implementations, specific expression of algorithms in code, specific power down and gating techniques/logic and other specific operational details of computer system in order to avoid unnecessarily obscuring the present disclosure.

Although the following embodiments may be described with reference to energy conservation, energy efficiency, processing efficiency, and so on in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from such features. For example, the disclosed embodiments are not limited to server computer system, desktop computer systems, laptops, Ultrabooks™, but may be also used in other devices, such as handheld devices, smartphones, tablets, other thin notebooks, systems on a chip (SOC) devices, and embedded applications. Some examples of handheld devices include cellular phones, Internet protocol devices, digital cameras, personal digital assistants (PDAs), and handheld PCs. Here, similar techniques for a high-performance interconnect may be applied to increase performance (or even save power) in a low power interconnect. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As may become readily apparent in the description below, the embodiments of methods, apparatus', and systems described herein (whether in reference to hardware, firmware, software, or a combination thereof) may be considered vital to a "green technology" future balanced with performance considerations.

As computing systems are advancing, the components therein are becoming more complex. The interconnect architecture to couple and communicate between the components has also increased in complexity to ensure bandwidth demand is met for optimal component operation. Furthermore, different market segments demand different aspects of interconnect architectures to suit the respective market. For example, servers require higher performance, while the mobile ecosystem is sometimes able to sacrifice overall performance for power savings. Yet, it is a singular purpose of most fabrics to provide highest possible performance with maximum power saving. Further, a variety of different interconnects can potentially benefit from subject matter described herein.

The Peripheral Component Interconnect (PCI) Express (PCIe) interconnect fabric architecture and QuickPath Interconnect (QPI) fabric architecture, among other examples, can potentially be improved according to one or more principles described herein, among other examples. For instance, a primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express. Although the primary discussion herein is in reference to a new high-performance interconnect (HPI) architecture, aspects of the invention described herein may be applied to other interconnect architectures, such as a PCIe-compliant architecture, a QPI-compliant architecture, a MIPI compliant architecture, a high-performance architecture, or other known interconnect architecture.

Referring to FIG. 1, an embodiment of a fabric composed of point-to-point Links that interconnect a set of components is illustrated. System 100 includes processor 105 and system memory 110 coupled to controller hub 115. Processor 105 can include any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 can include a root hub, root complex, or root controller, such as in a PCIe interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, can include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a bridge (e.g., a PCIe to PCI/PCI-X bridge) to support legacy or other versions of devices or interconnect fabrics supported by such devices.

Graphics accelerator 130 can also be coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
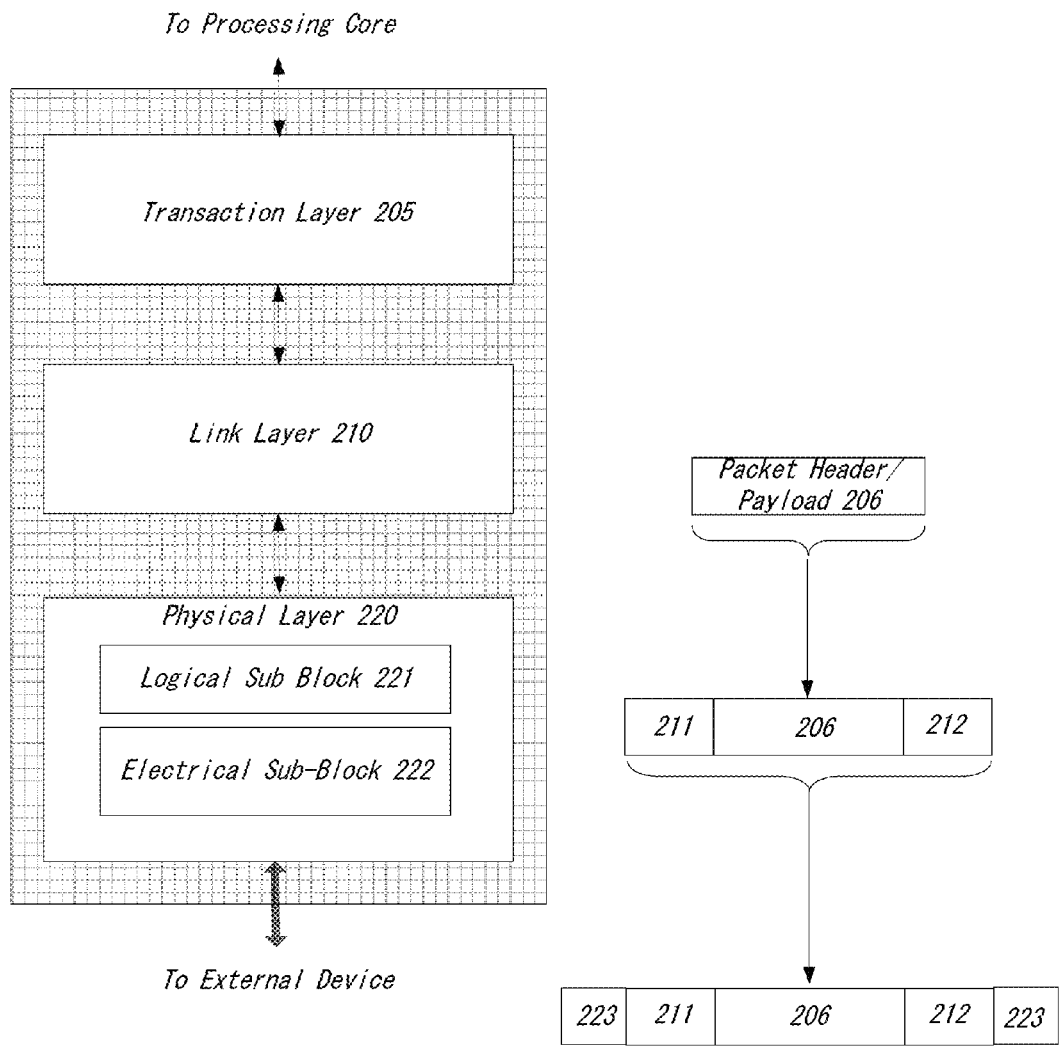
FIG. 2 illustrates a simplified block diagram of a layered protocol stack in accordance with one embodiment.

Turning to FIG. 2 an embodiment of a layered protocol stack is illustrated. Layered protocol stack 200 can includes any form of a layered communication stack, such as a QPI stack, a PCIe stack, a next generation high performance computing interconnect (HPI) stack, or other layered stack. In one embodiment, protocol stack 200 can include transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

Packets can be used to communicate information between components. Packets can be formed in the Transaction Layer 205 and Data Link Layer 210 to carry the information from the transmitting component to the receiving component. As the transmitted packets flow through the other layers, they are extended with additional information used to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

In one embodiment, transaction layer 205 can provide an interface between a device's processing core and the interconnect architecture, such as Data Link Layer 210 and Physical Layer 220. In this regard, a primary responsibility of the transaction layer 205 can include the assembly and disassembly of packets (i.e., transaction layer packets, or TLPs). The translation layer 205 can also manage credit-based flow control for TLPs. In some implementations, split transactions can be utilized, i.e., transactions with request and response separated by time, allowing a link to carry other traffic while the target device gathers data for the response, among other examples.

Credit-based flow control can be used to realize virtual channels and networks utilizing the interconnect fabric. In one example, a device can advertise an initial amount of credits for each of the receive buffers in Transaction Layer 205. An external device at the opposite end of the link, such as controller hub 115 in FIG. 1, can count the number of credits consumed by each TLP. A transaction may be transmitted if the transaction does not exceed a credit limit. Upon receiving a response an amount of credit is restored. One example of an advantage of such a credit scheme is that the latency of credit return does not affect performance, provided that the credit limit is not encountered, among other potential advantages.

In one embodiment, four transaction address spaces can include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions can be used to access configuration space of various devices connected to the interconnect. Transactions to the configuration space can include read requests and write requests. Message space transactions (or, simply messages) can also be defined to support in-band communication between interconnect agents. Therefore, in one example embodiment, transaction layer 205 can assemble packet header/payload 206.

Quickly referring to FIG. 3, an example embodiment of a transaction layer packet descriptor is illustrated. In one embodiment, transaction descriptor 300 can be a mechanism for carrying transaction information. In this regard, transaction descriptor 300 supports identification of transactions in a system. Other potential uses include tracking modifications of default transaction ordering and association of transaction with channels. For instance, transaction descriptor 300 can include global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and can be unique for all outstanding requests that require a completion for that requesting agent. Furthermore, in this example, source identifier 310 uniquely identifies the requestor agent within an interconnect hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Returning to the discussion of FIG. 2, a Link layer 210, also referred to as data link layer 210, can act as an intermediate stage between transaction layer 205 and the physical layer 220. In one embodiment, a responsibility of the data link layer 210 is providing a reliable mechanism for exchanging Transaction Layer Packets (TLPs) between two components on a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

In one example, physical layer 220 includes logical sub block 221 and electrical sub-block 222 to physically transmit a packet to an external device. Here, logical sub-block 221 is responsible for the "digital" functions of Physical Layer 221. In this regard, the logical sub-block can include a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one example embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a protocol stack (such as a PCIe protocol stack), a layered protocol stack is not so limited. In fact, any layered protocol may be included/implemented and adopt features discussed herein. As an example, a port/interface that is represented as a layered protocol can include: (1) a first layer to assemble packets, i.e. a transaction layer; a second layer to sequence packets, i.e. a link layer; and a third layer to transmit the packets, i.e. a physical layer. As a specific example, a high performance interconnect layered protocol, as described herein, is utilized.

Referring next to FIG. 4, an example embodiment of a serial point to point fabric is illustrated. A serial point-to-point link can include any transmission path for transmitting serial data. In the embodiment shown, a link can include two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in some implementations of a link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported link width, such as 1, 2, 4, 8, 12, 16, 32, 64, or wider.

A differential pair can refer to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, among other example advantages. This allows for a better timing window, which enables faster transmission frequencies.

In one embodiment, a new High Performance Interconnect (HPI) is provided. HPI can include a next-generation cache-coherent, link-based interconnect. As one example, HPI may be utilized in high performance computing platforms, such as workstations or servers, including in systems where PCIe or another interconnect protocol is typically used to connect processors, accelerators, I/O devices, and the like. However, HPI is not so limited. Instead, HPI may be utilized in any of the systems or platforms described herein. Furthermore, the individual ideas developed may be applied to other interconnects and platforms, such as PCIe, MIPI, QPI, etc.

Figure 5:
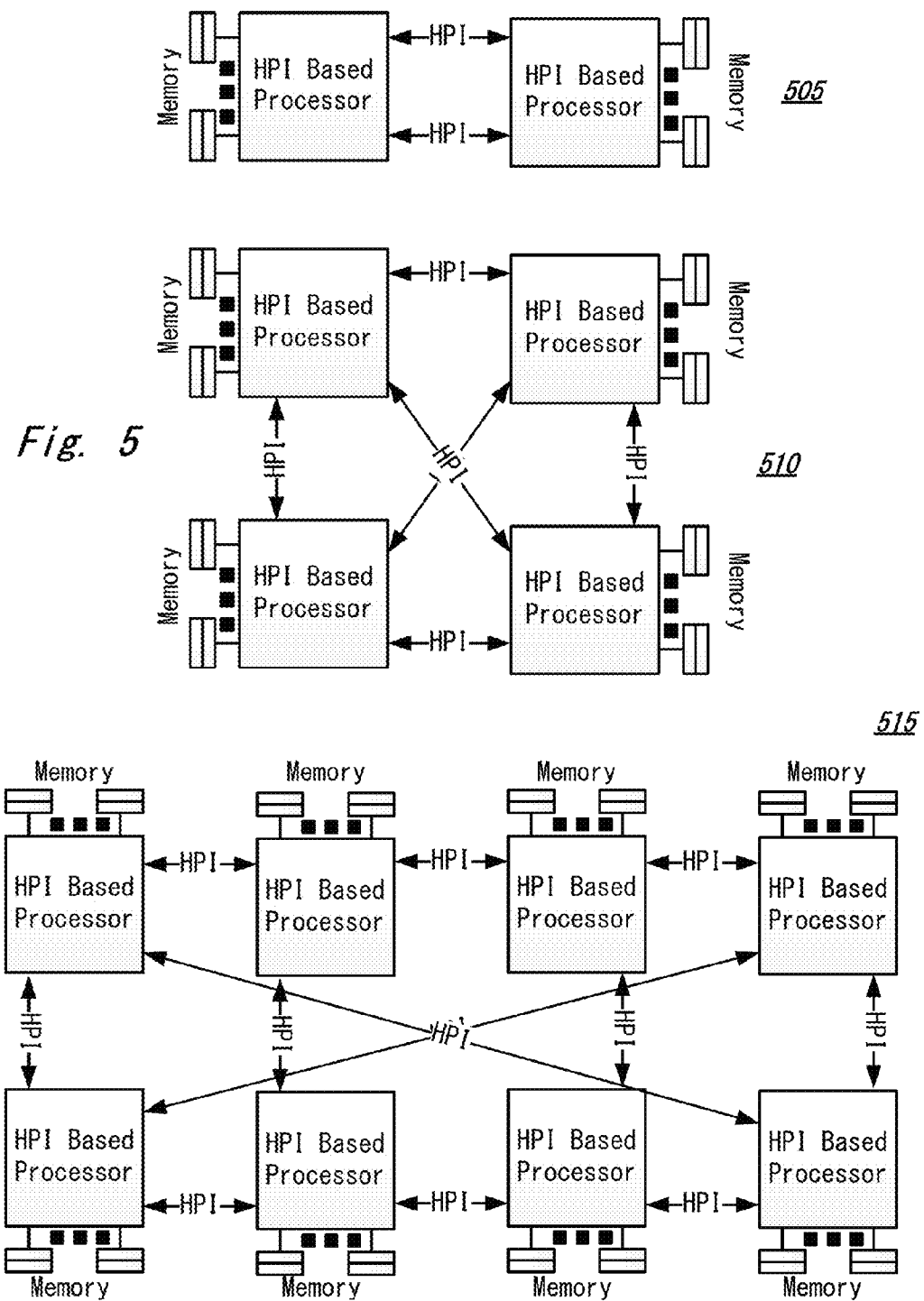
FIG. 5 illustrates embodiments of potential High Performance Interconnect (HPI) system configurations.

To support multiple devices, in one example implementation, HPI can include an Instruction Set Architecture (ISA) agnostic (i.e. HPI is able to be implemented in multiple different devices). In another scenario, HPI may also be utilized to connect high performance I/O devices, not just processors or accelerators. For example, a high performance PCIe device may be coupled to HPI through an appropriate translation bridge (i.e. HPI to PCIe). Moreover, the HPI links may be utilized by many HPI based devices, such as processors, in various ways (e.g. stars, rings, meshes, etc.). FIG. 5 illustrates example implementations of multiple potential multi-socket configurations. A two-socket configuration 505, as depicted, can include two HPI links; however, in other implementations, one HPI link may be utilized. For larger topologies, any configuration may be utilized as long as an identifier (ID) is assignable and there is some form of virtual path, among other additional or substitute features. As shown, in one example, a four socket configuration 510 has an HPI link from each processor to another. But in the eight socket implementation shown in configuration 515, not every socket is directly connected to each other through an HPI link. However, if a virtual path or channel exists between the processors, the configuration is supported. A range of supported processors includes 2-32 in a native domain. Higher numbers of processors may be reached through use of multiple domains or other interconnects between node controllers, among other examples.

The HPI architecture includes a definition of a layered protocol architecture, including in some examples, protocol layers (coherent, non-coherent, and, optionally, other memory based protocols), a routing layer, a link layer, and a physical layer. Furthermore, HPI can further include enhancements related to power managers (such as power control units (PCUs)), design for test and debug (DFT), fault handling, registers, security, among other examples. FIG. 5 illustrates an embodiment of an example HPI layered protocol stack. In some implementations, at least some of the layers illustrated in FIG. 5 may be optional. Each layer deals with its own level of granularity or quantum of information (the protocol layer 605a,b with packets 630, link layer 610a,b with flits 635, and physical layer 605a,b with phits 640). Note that a packet, in some embodiments, may include partial flits, a single flit, or multiple flits based on the implementation.

As a first example, a width of a phit 640 includes a 1 to 1 mapping of link width to bits (e.g. 20 bit link width includes a phit of 20 bits, etc.). Flits may have a greater size, such as 184, 192, or 200 bits. Note that if phit 640 is 20 bits wide and the size of flit 635 is 184 bits then it takes a fractional number of phits 640 to transmit one flit 635 (e.g. 9.2 phits at 20 bits to transmit an 184 bit flit 635 or 9.6 at 20 bits to transmit a 192 bit flit, among other examples). Note that widths of the fundamental link at the physical layer may vary. For example, the number of lanes per direction may include 2, 4, 6, 8, 10, 12, 14, 16, 18, 20, 22, 24, etc. In one embodiment, link layer 610a,b is capable of embedding multiple pieces of different transactions in a single flit, and one or multiple headers (e.g. 1, 2, 3, 4) may be embedded within the flit. In one example, HPI splits the headers into corresponding slots to enable multiple messages in the flit destined for different nodes.

Physical layer 605a,b, in one embodiment, can be responsible for the fast transfer of information on the physical medium (electrical or optical etc.). The physical link can be point-to-point between two Link layer entities, such as layer 605a and 605b. The Link layer 610a,b can abstract the Physical layer 605a,b from the upper layers and provides the capability to reliably transfer data (as well as requests) and manage flow control between two directly connected entities. The Link Layer can also be responsible for virtualizing the physical channel into multiple virtual channels and message classes. The Protocol layer 620a,b relies on the Link layer 610a,b to map protocol messages into the appropriate message classes and virtual channels before handing them to the Physical layer 605a,b for transfer across the physical links. Link layer 610a,b may support multiple messages, such as a request, snoop, response, writeback, non-coherent data, among other examples.

Figure 6:
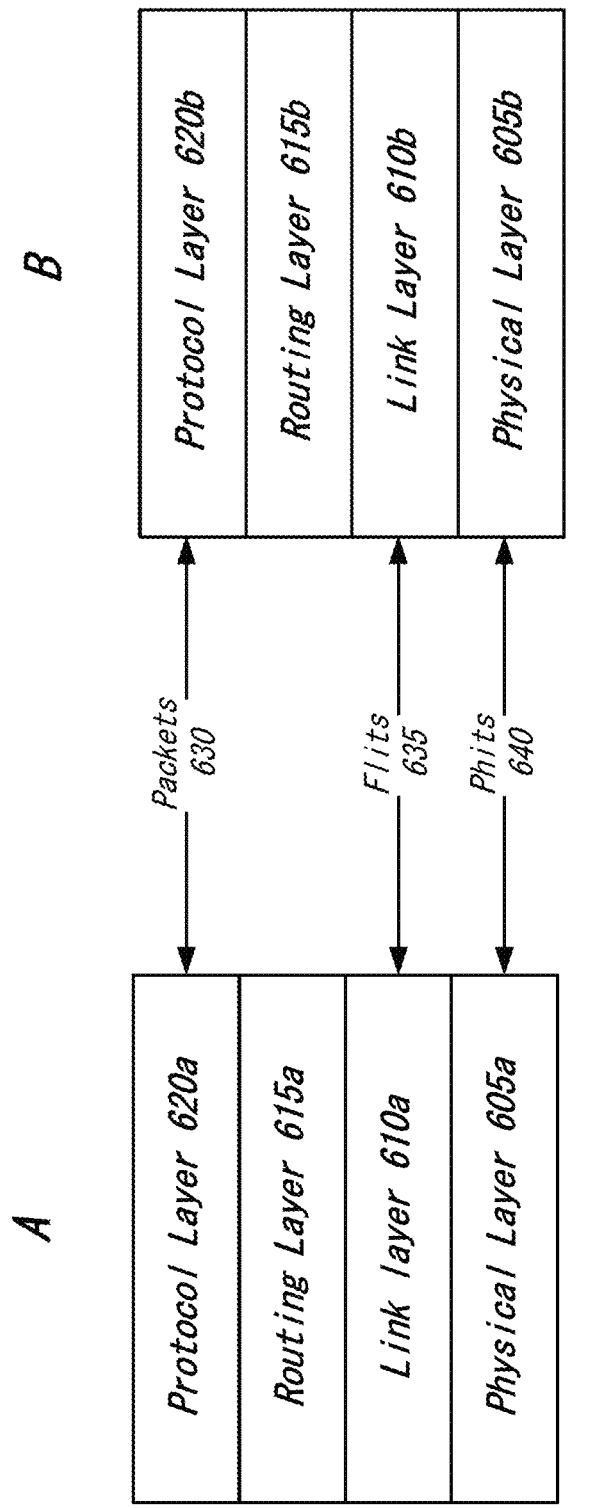
FIG. 6 illustrates an embodiment of a layered protocol stack associated with HPI.

The Physical layer 605a,b (or PHY) of HPI can be implemented above the electrical layer (i.e. electrical conductors connecting two components) and below the link layer 610a,b, as illustrated in FIG. 6. The Physical layer and corresponding logic can reside on each agent and connects the link layers on two agents (A and B) separated from each other (e.g. on devices on either side of a link). The local and remote electrical layers are connected by physical media (e.g. wires, conductors, optical, etc.). The Physical layer 605a,b, in one embodiment, has two major phases, initialization and operation. During initialization, the connection is opaque to the link layer and signaling may involve a combination of timed states and handshake events. During operation, the connection is transparent to the link layer and signaling is at a speed, with all lanes operating together as a single link. During the operation phase, the Physical layer transports flits from agent A to agent B and from agent B to agent A. The connection is also referred to as a link and abstracts some physical aspects including media, width and speed from the link layers while exchanging flits and control/status of current configuration (e.g. width) with the link layer. The initialization phase includes minor phases e.g. Polling, Configuration. The operation phase also includes minor phases (e.g. link power management states).

In one embodiment, Link layer 610a,b can be implemented so as to provide reliable data transfer between two protocol or routing entities. The Link layer can abstract Physical layer 605a,b from the Protocol layer 620a,b, and can be responsible for the flow control between two protocol agents (A, B), and provide virtual channel services to the Protocol layer (Message Classes) and Routing layer (Virtual Networks). The interface between the Protocol layer 620a,b and the Link Layer 610a,b can typically be at the packet level. In one embodiment, the smallest transfer unit at the Link Layer is referred to as a flit which a specified number of bits, such as 192 bits or some other denomination. The Link Layer 610a,b relies on the Physical layer 605a,b to frame the Physical layer's 605a,b unit of transfer (phit) into the Link Layer's 610a,b unit of transfer (flit). In addition, the Link Layer 610a,b may be logically broken into two parts, a sender and a receiver. A sender/receiver pair on one entity may be connected to a receiver/sender pair on another entity. Flow Control is often performed on both a flit and a packet basis. Error detection and correction is also potentially performed on a flit level basis.

In one embodiment, Routing layer 615a,b can provide a flexible and distributed method to route HPI transactions from a source to a destination. The scheme is flexible since routing algorithms for multiple topologies may be specified through programmable routing tables at each router (the programming in one embodiment is performed by firmware, software, or a combination thereof). The routing functionality may be distributed; the routing may be done through a series of routing steps, with each routing step being defined through a lookup of a table at either the source, intermediate, or destination routers. The lookup at a source may be used to inject a HPI packet into the HPI fabric. The lookup at an intermediate router may be used to route an HPI packet from an input port to an output port. The lookup at a destination port may be used to target the destination HPI protocol agent. Note that the Routing layer, in some implementations, can be thin since the routing tables, and, hence the routing algorithms, are not specifically defined by specification. This allows for flexibility and a variety of usage models, including flexible platform architectural topologies to be defined by the system implementation. The Routing layer 615a,b relies on the Link layer 610a,b for providing the use of up to three (or more) virtual networks (VNs)—in one example, two deadlock-free VNs, VN0 and VN1 with several message classes defined in each virtual network. A shared adaptive virtual network (VNA) may be defined in the Link layer, but this adaptive network may not be exposed directly in routing concepts, since each message class and virtual network may have dedicated resources and guaranteed forward progress, among other features and examples.

In one embodiment, HPI can include a Coherence Protocol layer 620a,b to support agents caching lines of data from memory. An agent wishing to cache memory data may use the coherence protocol to read the line of data to load into its cache. An agent wishing to modify a line of data in its cache may use the coherence protocol to acquire ownership of the line before modifying the data. After modifying a line, an agent may follow protocol requirements of keeping it in its cache until it either writes the line back to memory or includes the line in a response to an external request. Lastly, an agent may fulfill external requests to invalidate a line in its cache. The protocol ensures coherency of the data by dictating the rules all caching agents may follow. It also provides the means for agents without caches to coherently read and write memory data.

Two conditions may be enforced to support transactions utilizing the HPI Coherence Protocol. First, the protocol can maintain data consistency, as an example, on a per-address basis, among data in agents' caches and between those data and the data in memory. Informally, data consistency may refer to each valid line of data in an agent's cache representing a most up-to-date value of the data and data transmitted in a coherence protocol packet can represent the most up-to-date value of the data at the time it was sent. When no valid copy of the data exists in caches or in transmission, the protocol may ensure the most up-to-date value of the data resides in memory. Second, the protocol can provide well-defined commitment points for requests. Commitment points for reads may indicate when the data is usable; and for writes they may indicate when the written data is globally observable and will be loaded by subsequent reads. The protocol may support these commitment points for both cacheable and uncacheable (UC) requests in the coherent memory space.

In some implementations, HPI can utilize an embedded clock. A clock signal can be embedded in data transmitted using the interconnect. With the clock signal embedded in the data, distinct and dedicated clock lanes can be omitted. This can be useful, for instance, as it can allow more pins of a device to be dedicated to data transfer, particularly in systems where space for pins is at a premium.

Physical Layer

A link can be established between two agents on either side of an interconnect. An agent sending data can be a local agent and the agent receiving the data can be a remote agent. State machines can be employed by both agents to manage various aspects of the link. In one embodiment, the Physical layer datapath can transmit flits from the link layer to the electrical front-end. The control path, in one implementation, includes a state machine (also referred to as a link training state machine or the similar). The state machine's actions and exits from states may depend on internal signals, timers, external signals or other information. In fact, some of the states, such as a few initialization states, may have timers to provide a timeout value to exit a state. Note that detect, in some embodiments, refers to detecting an event on both legs of a lane; but not necessarily simultaneously. However, in other embodiments, detect refers to detection of an event by an agent of reference. Debounce, as one example, refers to sustained assertion of a signal. In one embodiment, HPI supports operation in the event of non-function lanes. Here, lanes may be dropped at specific states.

States defined in the state machine can include reset states, initialization states, and operational states, among other categories and subcategories. In one example, some initialization states can have a secondary timer which is used to exit the state on a timeout (essentially an abort due to failure to make progress in the state). An abort may include updating of registers, such as status register. Some states can also have primary timer(s) which are used to time the primary functions in the state. Other states can be defined such that internal or external signals (such as handshake protocols) drive transition from the state to another state, among other examples.

A state machine may also support debug through single step, freeze on initialization abort and use of testers. Here, state exits can be postponed/held until the debug software is ready. In some instance, the exit can be postponed/held until the secondary timeout. Actions and exits, in one embodiment, can be based on exchange of training sequences. In one embodiment, the link state machine is to run in the local agent clock domain and transition from one state to the next is to coincide with a transmitter training sequence boundary. Status registers may be utilized to reflect the current state.

Figure 7:
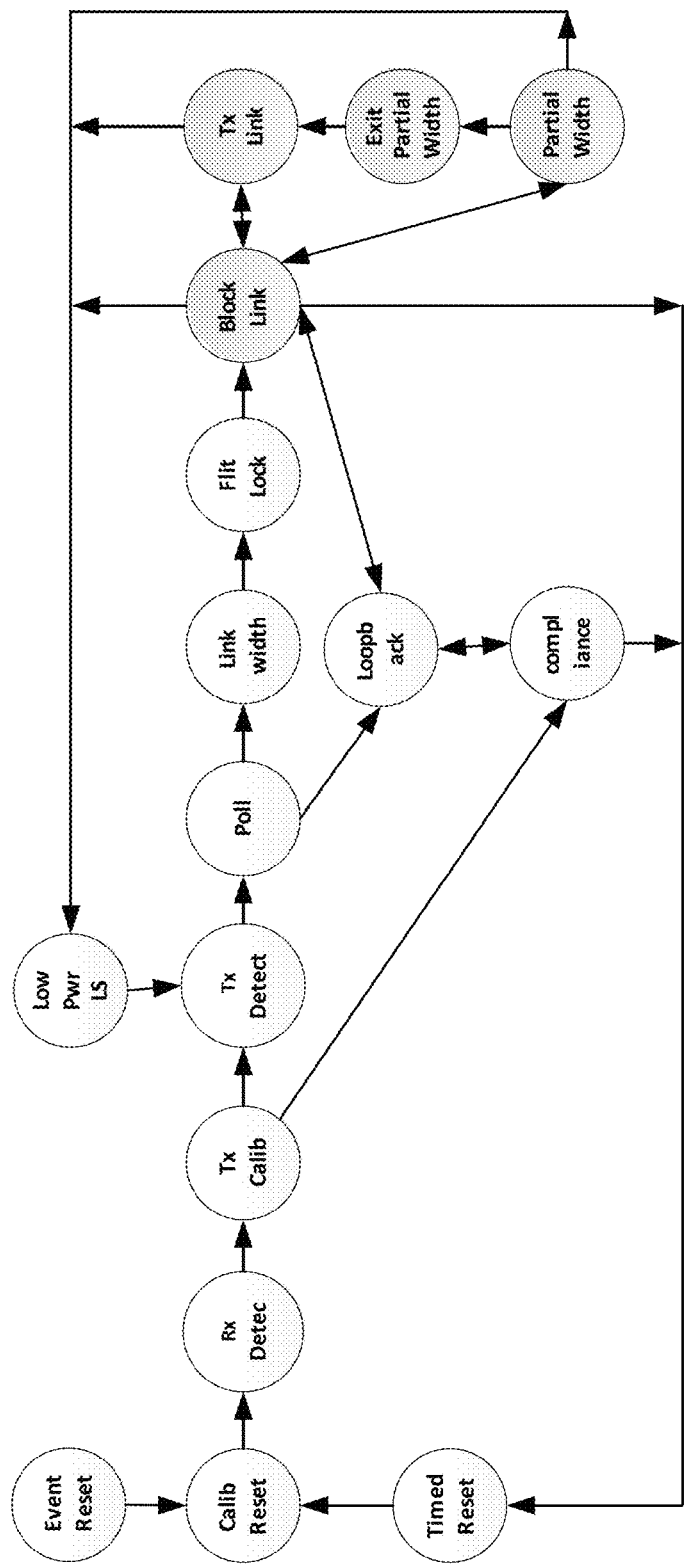
FIG. 7 illustrates a representation of an example state machine.

FIG. 7 illustrates a representation of at least a portion of a state machine used by agents in one example implementation of a high performance interconnect. It should be appreciated that the states included in the state table of FIG. 7 include a non-exhaustive listing of possible states. For instance, some transitions are omitted to simplify the diagram. Also, some states may be combined, split, or omitted, while others might be added and otherwise modified. As example, the state diagram can include states such as:

Event reset state: entered on a warm or cold reset event. Restores default values. Initialize counters (e.g., sync counters). May exit to another state, such as another reset state.

Timed reset state: timed state for in-band reset. May drive a predefined electrical ordered set (EOS) so remote receivers are capable of detecting the EOS and entering the timed reset as well. Receiver has lanes holding electrical settings. May exit to an agent to calibrate reset state.

Calibrate reset state: calibration without signaling on the lane (e.g. receiver calibration state) or turning drivers off. May be a predetermined amount of time in the state based on a timer. May set an operational speed. May act as a wait state when a port is not enabled. May include minimum residency time. Receiver conditioning or staggering off may occur based on design. May exit to a receiver detect state after a timeout and/or completion of calibration.

Receiver detect state: detect presence of a receiver on lane(s). May look for receiver termination (e.g. receiver pulldown insertion). May exit to calibrate reset state upon a specified value being set or when another specified value is not set. May exit to transmitter calibrate state if a receiver is detected or a timeout is reached.

Transmitter calibrate state: for transmitter calibrations. May be a timed state allocated for transmitter calibrations. May include signaling on a lane. May continuously drive an EOS, such as an electric idle exit ordered set (or EIEIOS). May exit to compliance state when done calibrating or on expiration of a timer. May exit to transmitter detect state if a counter has expired or a secondary timeout has occurred.

Transmitter detect state: qualifies valid signaling. May be a handshake state where an agent completes actions and exits to a next state based on remote agent signaling. Receiver may qualify valid signaling from transmitter. Receiver, in one embodiment, looks for a wake detect, and if debounced on one or more lanes looks for it on the other lanes. Transmitter drives a detect signal. May exit to a polling state in response to debounce being completed for all lanes and/or a timeout or if debounce on all lanes is not complete and there is a timeout. Here, one or more monitor lanes may be kept awake to debounce a wake signal. And if debounced then the other lanes are potentially debounced. This can enable power savings in low power states.

Polling state: receiver adapts, initializes drift buffer and locks on bits/bytes (e.g. identifies symbol boundaries). Lanes may be deskewed. A remote agent may cause an exit to a next state (e.g. a Link Width State) in response to an acknowledge message. Polling can additionally include a training sequence lock by locking to an EOS and a training sequence header. Lane to lane skew at remote transmitter may be capped at a first length for top speed and a second length for slow speed. Deskew may be performed in a slow mode as well as an operational mode. Receiver may have a specific maximum to deskew lane-to-lane skew, such as 8, 16, or 32 intervals of skew. Receiver actions may include latency fixing. Receiver actions, in one embodiment, can be completed on successful deskew of a valid lane map. A successful handshake can be achieved, in one example, when a number of consecutive training sequence headers are received with acknowledgements and a number of training sequences with an acknowledge are transmitted after the receiver has completed its actions.

Link width state: agent communicates with the final lane map to remote transmitter. Receiver receives the information and decodes. Receiver may record a configured lane map in a structure after checkpoint of a previous lane map value in a second structure. Receiver may also respond with an acknowledge ("ACK"). May initiate an in-band reset. As one example, an agent can initiate in-band reset. In one embodiment, exit to a next state, such as flit configuration state, is performed in response to the ACK. Further, prior to entering low power state, a reset signal may also be generated if the frequency of a wake detect signal occurrence drops below a specified value (e.g. 1 every number of unit intervals (UIs), such as 4K UI). Receiver may hold current and previous lane maps. Transmitter may use different groups of lanes based on training sequences having different values. Lane map may not modify some status registers in some embodiments.

Flitlock configuration state: entered by a transmitter but the state is considered exited (i.e. secondary timeout moot)

when both transmitter and receiver have exited to a blocking link state or other link state. Transmitter exit to a link state, in one embodiment, includes start of a data sequence (SDS) signal and training sequence (TS) boundary after receiving a planetary alignment signal. Here, receiver exit may be based on receiving an SDS from a remote transmitter. This state may be a bridge from agent to link state. The receiver identifies the SDS and may exit to blocking link state (BLS) (or a control window) if SDS is received after a descrambler is initialized. If a timeout occurs, exit may be to reset state. Transmitter drives lanes with a configuration signal. Transmitter exit may be to reset, BLS, or other states based on conditions or timeouts.

Transmitting Link State: a link state. Flits are sent to a remote agent. State may be entered from a blocking link state and may return to a blocking link state on an event, such as a timeout. Transmitter transmits flits and receiver receives flits during the transmitting link state (TLS). May also exit to a low power link state from TLS. In some implementations, TLS can be referred to as the "L0" state.

Blocking Link State: a link state. Transmitter and receiver are operating in a unified manner. May be a timed state during which the link layer flits are held off while the Physical layer information is communicated to the remote agent. May exit to a low power link state (or other link state based on the design). A blocking link state (BLS), in one embodiment, may occur periodically. The period can be referred to as a BLS interval and may be timed, and can differ between slow speed and operational speed. Note that the link layer may be periodically blocked from sending flits so that a Physical layer control sequence of a length may be sent, such as during a transmitting link state or a partial width transmitting link state. In some implementations, blocking link state (BLS) can be referred to as a L0 control, or "L0c", state.

Figure 8:
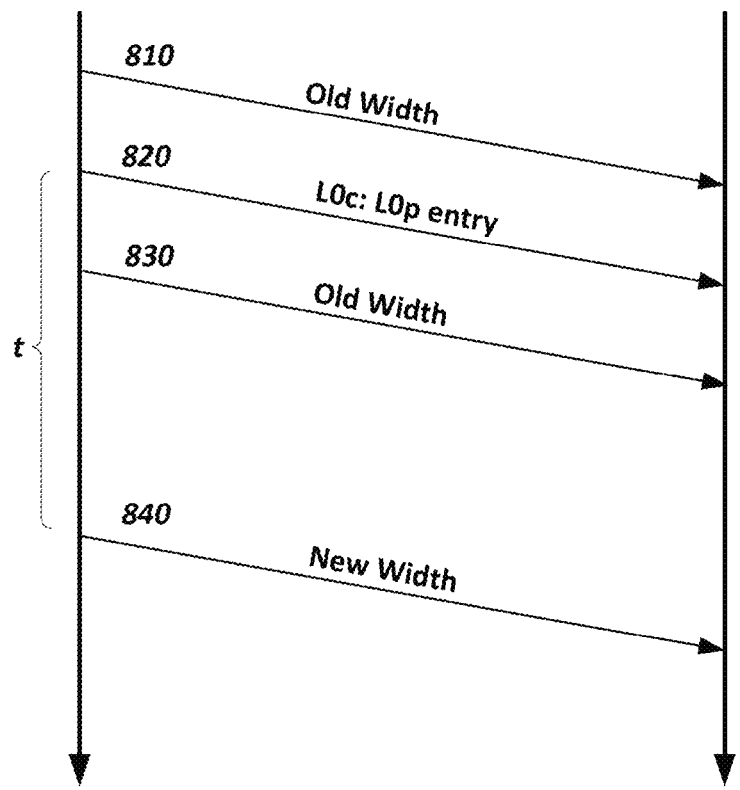
FIG. 8 illustrates a flow diagram of an example transition to a partial width state.

Partial Width Transmitting Link State: a power-saving link state. In one embodiment asymmetric partial width refers to each direction of a two direction link having different widths, which may be supported in some designs. FIG. 8 illustrates an example handshake to enter a partial width link state where at least a portion of the available lanes are made inactive during the state. For instance, a link may be used to send data 810 at a first width (such as full width) when a partial width entry request 820 indication to enter partial width transmitting link state that will support transmission at a second, new width. The link may continue to execute 830 at the old width for a period t before transitioning, such as in a staggered manner, a portion of the active lanes to an inactive state (or inactive lanes to an active state) and bring the link to the new width 840. Any mismatches may result in a reset of the link. While speed may not be altered in a partial width state, the width of the lanes of the link may be. Therefore, flits are potentially sent at different widths. The partial width state may exit to other link states, such as a low power link state based on certain received and sent messages or an exit of the partial width transmitting link state or a link blocking state based on other events. In one embodiment, a transmitter port may turn idle lanes off in a staggered manner to provide better signal integrity (i.e. noise mitigation). Non-retry-able flits, such as Null flits, may be utilized during periods where the link width is changing. A corresponding receiver may drop these null flits and turn idle lanes off in a staggered manner, as well as record the current and previous lane maps in one or more structures. Note status and associated status register may remain unaltered. In some implementations, partial width transmitting link state can be referred to as a partial L0, or L0p, state.

Exit Partial Width Transmitting Link State: exit the partial width state. May or may not use a blocking link state in some implementations. The transmitter initiates exit, in one embodiment, by sending partial width exit patterns on the idle lanes to train and deskew them. As one example, an exit pattern starts with EIEOS, which is detected and debounced to signal that the lane is ready to start the entry to a full transmitting link state, and may end with SDS or Fast Training Sequence (FTS) on idle lanes. Any failure during the exit sequence (receiver actions, such as deskew not completed prior to timeout) stops flit transfers to the link layer and asserts a reset, which is handled by resetting the link on the next blocking link state occurrence. The SDS may also initialize the scrambler/descrambler on the lanes to appropriate values.

Low Power Link State: is a lower power state. In one embodiment, it is lower power than the partial width link state, since signaling in this embodiment is stopped on all lanes and in both directions. Transmitters may use a blocking link state for requesting a low power link state. Here, receiver may decode the request and respond with an ACK or a NAK; otherwise reset may be triggered. In some implementations, low power link state can be referred to as a L1 state.

In some implementations, state transitions can be facilitated to allow states to be bypassed, for instance, when state actions of the states, such as certain calibrations and configurations, have already been completed. Previous state results and configurations of a link can be stored and reused in subsequent initializations and configurations of a link. Rather than repeating such configurations and state actions, corresponding states can be bypassed. Traditional systems implementing state bypasses, however, often implement complex designs and expensive validation escapes. Rather than using a traditional bypass, in one example, HPI can utilize short timers in certain states, such as where the state actions do not need to be repeated. This can potentially allow for more uniform and synchronized state machine transitions among other potential advantages.

In one example, a software-based controller (e.g., through an external control point for the Physical layer) can be used to assist in facilitating state management and transitions. Further, digital signals and patterns, or supersequences, can be defined, each supersequence corresponding to a respective state or entry/exit to/from the respective state. A supersequence can include a repeating sequence of data sets and symbols. The sequences can repeat, in some instances, until completion of a state or state transition, or communication of a corresponding event, among other examples. In some instances, the repeating sequence of a supersequence can repeat according to a defined frequency, such as a defined number of unit intervals (UIs). A unit interval (UI) can correspond to the interval of time for transmitting a single bit on a lane of a link or system. In some implementations, the repeating sequence can begin with an electrically ordered set (EOS). Accordingly, an instance of the EOS can be expected to repeat in accordance with the predefined frequency. Such ordered sets can be implemented as defined 16 Byte codes that may be represented in hexadecimal format, among other examples. In one example, the EOS of a supersequence can be an EIEIOS. In one example, an EIEOS can resemble a low frequency clock signal (e.g., a predefined number of repeating FF00 or FFF000 hexadecimal symbols, etc.). A predefined set of data can follow the EOS, such as a predefined number of training sequences or other data. Such supersequences can be utilized in state transitions including link state transitions as well as initialization, among other examples.

In some implementations of a high performance interconnect, terminations of a serial data link can be brought on and off, such as when a link is reset or initialized. This approach can introduce complexity and time into the initialization of a link. In some implementations, terminations of the link can be maintained including during a reset or re-initialization of the link. In one example, a supersequence can be defined corresponding to one or more initialization or re-initialization tasks. The pre-defined sequence can include an EIEOS followed by additional sequence data. In some instances, as each device on either side of a lane becomes active, the devices can begin sending a supersequence corresponding to a particular initialization state, etc. In one embodiment, two types of pin resets can be supported; power-on (or "cold") reset and warm reset. A reset initiated by software or originating (in the Physical or another layer) on one agent may be communicated in-band to the other agent. However, due to usage of an embedded clock, an in-band reset may be handled by communication to another agent using an ordered set, such as a specific electrical ordered set or EIOS.

The ordered set can be sent during initialization and a PHY control sequence (or "blocking link state") can be sent after initialization. The block link state can block the link layer from sending flits, for instance, to permit the sending of physical layer control messages. As another example, link layer traffic may be blocked to send a few NULL flits which may be discarded at the receiver.

As introduced above, initialization, in one embodiment, can be done initially at slow speed followed by initialization at fast speed. Initialization at slow speed uses the default values for the registers and timers. Software then uses the slow speed link to setup the registers, timers and electrical parameters and clears the calibration semaphores to pave the way for fast speed initialization. As one example, initialization can consist of such states or tasks as Reset, Detect, Polling, and Configuration, among potentially others.

In one example, a link layer blocking control sequence (i.e. a blocking link state (BLS) or L0c state) can include a timed state during which the link layer flits are held off while the PHY information is communicated to the remote agent. Here, the transmitter and receiver may start a block control sequence timer. And upon expiration of the timers, the transmitter and receiver can exit the blocking state and may take other actions, such as exit to reset, exit to a different link state (or other state), including states that allow for the sending of flits across the link.

In one embodiment, link training can be provided and include the sending of one or more of scrambled training sequences, ordered sets, and control sequences, such as in connection with a defined supersequence. A training sequence symbol may include one or more of a header, reserved portions, a target latency, a pair number, a physical lane map code reference lanes or a group of lanes, and an initialization state. In one embodiment, the header can be sent with a ACK or NAK, among other examples. As an example, training sequences may be sent as part of supersequences and may be scrambled.

In one embodiment, ordered sets and control sequences are not scrambled or staggered and are transmitted identically, simultaneously and completely on all lanes. A valid reception of an ordered set may include checking of at least a portion of the ordered set (or entire ordered set for partial ordered sets). Ordered sets may include an electrically ordered set (EOS), such as an Electrical Idle Ordered Set (EIOS) or an EIEOS. A supersequence may include a start of a data sequence (SDS) or a Fast Training Sequence (FTS). Such sets and control supersequences can be predefined and may have any pattern or hexadecimal representation, as well as any length. For example, ordered sets and supersequences may be a length of 8 bytes, 16, bytes, or 32 bytes, etc. FTS, as an example, can additionally be utilized for fast bit lock during exit of a partial width transmitting link state. Note that the FTS definition may be per lane and may utilize a rotated version of the FTS.

Supersequences, in one embodiment, can include the insertion of an EOS, such as an EIEOS, in a training sequence stream. When signaling starts, lanes, in one implementation, power-on in a staggered manner. This may result, however, in initial supersequences being seen truncated at the receiver on some lanes. Supersequences can be repeated however over short intervals (e.g., approximately one-thousand unit intervals (or ~1KUI)). The training supersequences may additionally be used for one or more of deskew, configuration and for communicating initialization target, lane map, etc. The EIEOS can be used for one or more of transitioning a lane from inactive to active state, screening for good lanes, identifying symbol and TS boundaries, among other examples.

Turning to FIG. 9, representations of example supersequences are shown. For instance, an exemplary Detect supersequence 905 can be defined. The Detect supersequence 905 can include a repeating sequence of a single EIEOS (or other EOS) followed by a predefined number of instances of a particular training sequence (TS). In one example, the EIEOS can be transmitted, immediately followed by seven repeated instances of TS. When the last of the seven TSes is sent the EIEOS can be sent again followed by seven additional instances of TS, and so on. This sequence can be repeated according to a particular predefined frequency. In the example of FIG. 9, the EIEOS can reappear on the lanes approximately once every one thousand UIs (~1 KUI) followed by the remainder of the Detect supersequence 905. A receiver can monitor lanes for the presence of a repeating Detect supersequence 905 and upon validating the supersequence 905 can conclude that a remote agent is present, has been added (e.g., hot plugged) on the lanes, has awoke, or is reinitializing, etc.

In another example, another supersequence 910 can be defined to indicate a polling, configuration, or loopback condition or state. As with the example Detect supersequence 905, lanes of a link can be monitored by a receiver for such a Poll/Config/Loop supersequence 910 to identify a polling state, configuration state, or loopback state or condition. In one example, a Poll/Config/Loop supersequence 910 can begin with an EIEOS followed by a predefined number of repeated instances of a TS. For instance, in one example the EIEOS can be followed by thirty-one (31) instances of TS with the EIEOS repeating approximately every four thousand UI (e.g., ~4 KUI).

Further, in another example, a partial width transmitting state (PWTS) exit supersequence 915 can be defined. In one example, a PWTS exit supersequence can include an initial EIEOS to repeat to pre-condition lanes in advance of the sending of the first full sequence in the supersequence. For instance, the sequence to be repeated in supersequence 915 can begin with an EIEOS (to repeat approximately once every 1 KUI). Further, fast training sequences (FTS) can be utilized in lieu of other training sequences (TS), the FTS configured to assist in quicker bit lock, byte lock, and deskewing. In some implementations, an FTS can be unscrambled to further assist in bringing idle lanes back to active as quickly and non-disruptively as possible. As with other supersequences preceding an entry into a link transmitting state, the supersequence 915 can be interrupted and ended through the sending of a start of data sequence (SDS). Further, a partial FTS (FTSp) can be sent to assist in synchronizing the new lanes to the active lanes, such as by allowing bits to be subtracted (or added) to the FTSp, among other examples.

Supersequences, such as Detect supersequence 705 and Poll/Config/Loop supersequence 710, etc. can potentially be sent substantially throughout the initialization or re-initialization of a link. A receiver, upon receiving and detecting a particular supersequence can, in some instances, respond by echoing the same supersequence to the transmitter over the lanes. The receiving and validation of a particular supersequence by transmitter and receiver can serve as a handshake to acknowledge a state or condition communicated through the supersequence. For instance, such a handshake (e.g., utilizing a Detect supersequence 705) can be used to identify reinitialization of a link. In another example, such a handshake can be utilized to indicate the end of an electrical reset or low power state, resulting in corresponding lanes being brought back up, among other examples. The end of the electrical reset can be identified, for instance, from a handshake between transmitter and receiver each transmitting a Detect supersequence 705.

In another example, lanes can be monitored for supersequences and use the supersequences in connection with the screening of lanes for detect, wake, and other state exits and entries, among other events. The predefined and predictable nature and form of supersequences can be further used to perform such initialization tasks as bit lock, byte lock, debouncing, descrambling, deskewing, adaptation, latency fixing, negotiated delays, and other potential uses. Indeed, lanes can be substantially continuously monitored for such events to quicken the ability of the system to react to and process such conditions.

Once the link has been successfully calibrated and configured, initialization can end and can transition to the transmitting link state (TLS) in which flits begin to be transmitted. In some implementations, transitions to TLS can be based on planetary alignment on the system. For instance, a planetary alignment signal can indicate an opportunity to transition to TLS. Rather than transitioning at an edge of a supersequence, EIEOS, or TLS, some implementations of HPI can utilize a start of data sequence (SDS) symbol sent in accordance with the planetary alignment to end initialization and transition to TLS. In some implementations, In one example, an SDS can be sent anywhere in an initialization bit stream. Accordingly, a receiver can continuously scan received bits for the SDS to hasten ending of the initialization in accordance with a planetary alignment.

In one example, an example EIEOS can emulate a low frequency clock signal, such as a repeating FF00 signal. In one example, the first byte (e.g., byte 0) of the SDS can be 0xE1 followed by at least twelve bytes with a value 0xAA. Accordingly, in such instances, detecting an SDS sent in the middle of an EIEOS can be relatively simple to identify, as the risk of aliasing within the EIEOS can be minimal. Scrambling of TS payloads, however, and the resulting randomness of the TS data can introduce the risk of aliasing of some forms of an SDS. In some implementations, a PRBS can be generated that will never alias a defined SDS (or identifying portions of the SDS) over any particular span of a number of bits. Further, a tail or suffix can be provided on a TS, such as using the last bytes of the TS to cause the PRBS to be XOR 0 values in the suffix and effectively present the PRBS in cleartext at the end of the TS. If the suffix is sufficiently long, the PRBS values reflected in the scrambled suffix can make it virtually impossible for an SDS to be aliased in the scrambled payload of a TS.

In one example, a transmitting device can attempt to enter a particular state. For instance, the transmitting device can attempt to activate the link and enter an initialization state. In another example, the transmitting device can attempt to exit a low power state, such as an L1 state, among other examples. In some instances of an L1 state, the L1 state can serve as a power savings, idle, or standby state. Indeed, in some examples, main power supplies may remain active in the L1 state. In exiting an L1 state, a first device can send a supersequence associated with transitioning from the L1 state to a particular other state, such as an L0 transmitting link state (TLS). The supersequence, as in other examples, can be a repeating sequence of an EOS followed by a predetermined number of TSes such that the EOS is repeated at a particular predefined frequency. In one examples, a Detect supersequence can be used to exit the L1 or other low power state. A receiving device can receive and validate the data, identifying the supersequence, and the receiving device can complete the handshake with the transmitting device by sending the supersequence back to the transmitting device.

With both the transmitting and receiving devices receiving the same supersequence, each device can further perform additional initialization tasks utilizing the supersequences. For instance, each device can perform debouncing, bit lock, byte lock, descrambling, and deskewing utilizing the supersequences. Additional initialization information can be communicated through the headers and payloads of the TSes included in the supersequences. When the link is initialized, an SDS can be sent, in some cases, interrupting the supersequence (e.g., sent in the middle of a TS or EIEOS) and the respective devices on either side of the link can prepare for the synchronized entry into TLS. In TLS, or an "L0" state, supersequences can be ended and flits can be transmitted utilizing the Link layer of the protocol stack.

Figure 10:
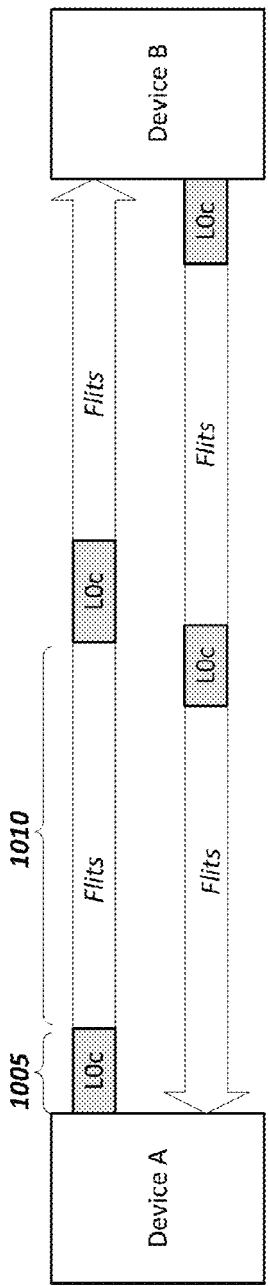
FIG. 10 illustrates a representation of an example control window embedded in a data stream.

While in TLS, the Physical layer can be provided opportunities to perform control tasks. For instance, bit errors and other errors may be identified on one or more lanes during an L0 state. Further link state transitions may be desired. In one implementation, a control state L0c can be provided to facilitate messaging related to such control tasks. The L0c state can be provided as a periodic window within the TLS to allow Physical layer control messages to be sent between streams of flits sent using the Link layer. For instance, as represented in the example illustrated in FIG. 10, an L0 state can be subdivided into L0c intervals. Each L0c interval can begin with a L0c state or window (e.g., 1005) in which Physical layer control codes and other data can be sent. The remainder (e.g., 1010) of the L0c interval can be dedicated to the sending of flits. The length of the L0c interval and L0c state in each interval can be programmatically defined, for instance by BIOS of one or more devices or another software-based controller, among other examples. The L0c state can be exponentially shorter than the remainder of an L0c interval. For instance, in one example, the L0c can be 8 UI while the remainder of the L0c interval is on the order of 4 KUI, among other examples. This can allow windows in which relatively short, predefined messages can be sent without substantially disrupting or wasting link data bandwidth.

Figure 11:
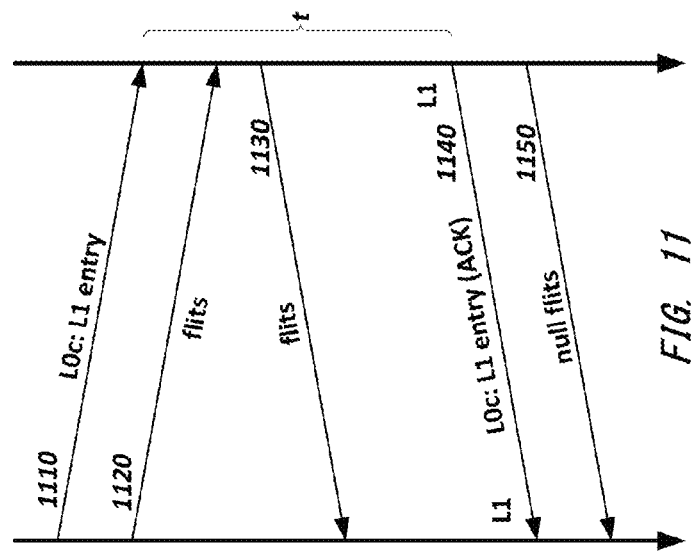
FIG. 11 illustrates a flow diagram of an example handshake.

L0c state message can communicate a variety of conditions at the Physical layer level. In one example, one device can initiate a reset of the link or a lane, for instance, based on bit errors or other errors in excess of a particular threshold amount. Such errors can also be communicated in L0c windows (such as preceding L0c windows). The L0c state can also be leveraged to realize other in-band signaling, such as signaling for use in aiding or triggering transitions between other link states. In one example, L0c messages can be utilized to transition a link from an active L0 state to a standby or low power state, such as an L1 state. As shown in the simplified flow diagram of FIG. 11, a particular L0c state can be used to communicate a L1 entry request (e.g., 1110). Further flits (e.g., 1120, 1130) can be sent while the device (or agent on the device) waits for an acknowledgement of the request 1110. The other device on the link can send the acknowledgement (e.g., 1140). In some examples, the acknowledgement can also be sent in a L0c window. In some instances, the acknowledgement can be sent in the next L0c window following receipt/sending of the L1 request 1110. Timers can be employed to synchronize the L0c intervals at each device and the requesting device can identify the acknowledgement 1140 as an acknowledgement of the request 1110 (e.g., rather than an independent L1 entry request) based on an identification that the acknowledgement 1140 was sent at the next L0c window, among other examples. In some instances, an acknowledgement can be communicated through an L0c code distinct from that used in the L1 entry request 1110. In other instances, the acknowledgement 1140 can include the echoing of the L1 entry request code used in request 1110, among other examples. Further, in alternative examples, a non-acknowledge signal or NAK can be communicated in the L0c window. In still other instances, a no operation code (or NOP) can be encoded in the L0c window. For instance, when the L0c is not needed for any state transition, a NOP can be sent. The NOP can be sent at the beginning of an L0c window and cause the link to prematurely exit the L0c window and go back to its previous state (e.g., L0 or L0p). A NOP may be sent, for instance, in an L0c window following a previous request (such as to enter L0p), while the requester awaits an ACK (e.g., after receiving a NAK to the request), among other examples.

In addition (or as an alternate) to handshaking using L0c codes, supersequences, such as Detect supersequence, can be sent in connection with resetting and re-initializing the link. Further handshaking can occur between the devices as the supersequences sent by a first device and echoed by the second, receiving device. Supersequences can be used, as described above, to assist in the reinitialization of the link including debouncing, bit lock, byte lock, descrambling, and deskewing the lanes of the link. Further, the devices can utilize the timer (e.g., embodying the L0c interval) to synchronize entry of the devices and the link into the requested L1 state. For instance, receipt of the acknowledgement 1140 can indicate to the devices that they are to mutually enter (or begin entering) the L1 state at the end of the L0c interval corresponding to the L0c window in which the acknowledgement was sent, among other examples. For instance, data sent in an L0c window included in or otherwise associated with the acknowledgement 1140 can indicate the time at which the devices are to enter the L1 state, among other potential examples. Additional flits (e.g., 1150), in some instances, can be sent while the devices await the timeout corresponding to the transition into the L1 state.

Figures 12, 15:
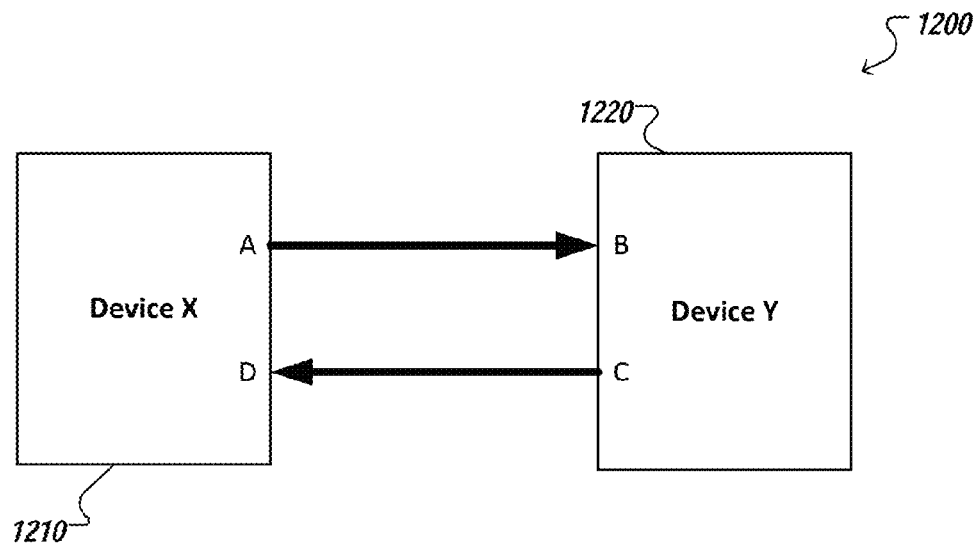
FIG. 12 illustrate a block diagram of two devices coupled by a bi-directional link.
FIG. 15 illustrates a representation of an example start of data sequence (SDS).

FIG. 12 illustrates a simplified block diagram 1200 representing two devices 1210, 1220 coupled by a bi-directional link. The examples of FIGS. 13, 14, 16A, 16B, 17A, and 17B make reference to the diagram 1200 and Devices X and Y (1210 and 1220), as well as the respective transmitter ports labeled "A" and "C" and receiver ports "B" and "D".

Figure 13:
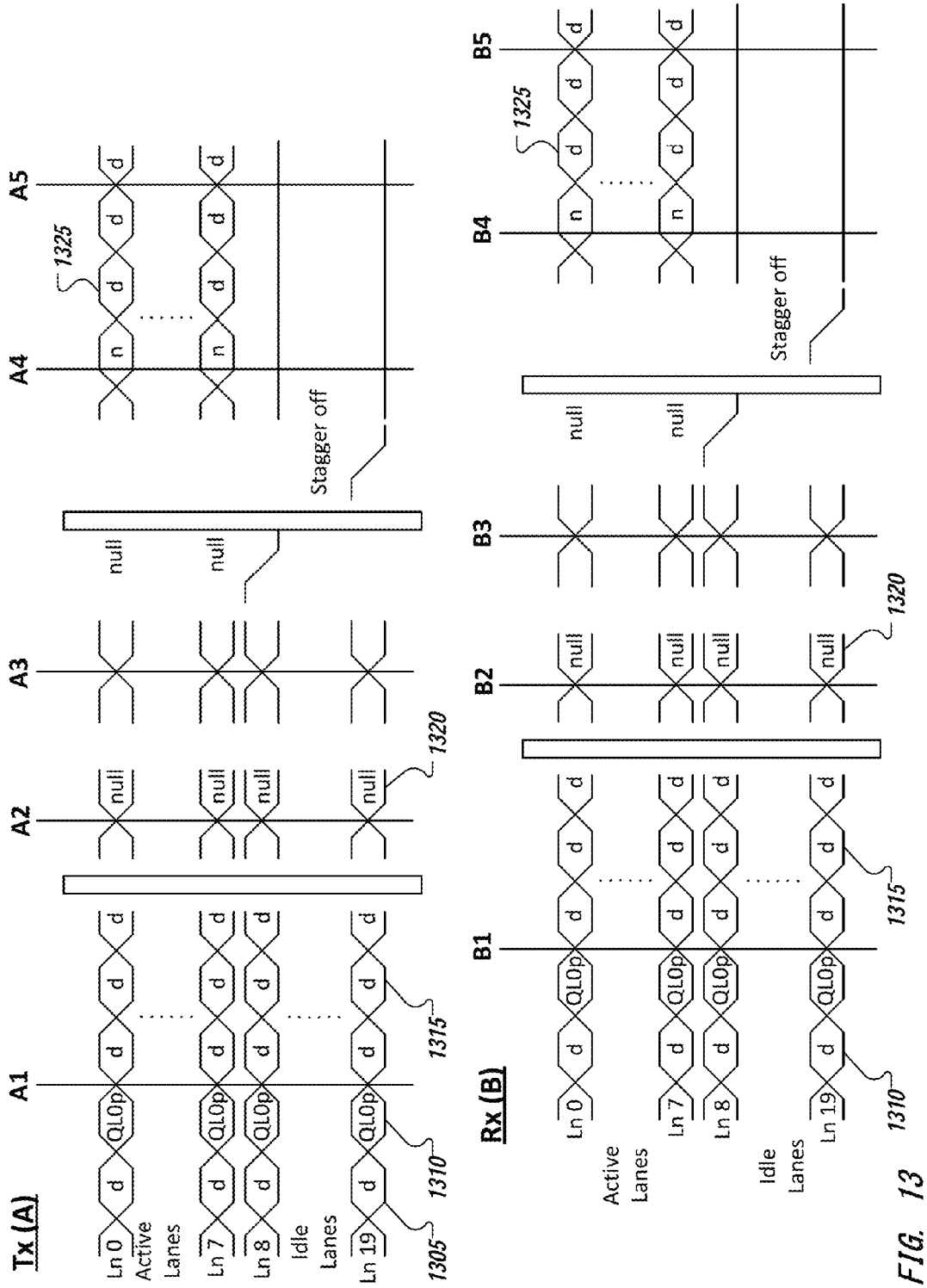
FIG. 13 illustrates an example transition to a partial width state.

For instance, in FIG. 13, the L0c state can also be used to enter and/or exit partial width states. In some implementations, entering or exiting a partial width low power state can be adapted to take place efficiently and quickly so as to minimize the impact on a link. Partial (or reduced) width operation (in L0p) can be asymmetric in that the partial width is different in each direction of the link (such that a different number of lanes is active on each direction of the link). FIG. 13 illustrates a simplified flow diagram 1300 is shown illustrating an example transition from an L0 active state to a partial width state L0p. Data (e.g., 1305) can be sent (and received) on the lanes of the link and interrupted by a L0c interval in which a request (e.g., "QL0p") 1310 to enter the partial width state is sent on the lanes. Once the L0c interval ends (e.g., at A1), a period of time, number of flits, etc. can be set to pass before the link's transition to L0p is triggered. Flit data (e.g., 1315) can continue to be sent to maximize data transfer while the devices anticipate to enter the state transition.

In one example, transitioning to the partial width state can involve the sending of null flits (e.g., 1320) on the lanes (e.g., from A2 to A4). The null flits can be sent during the transitioning to provide more immunity against noise. The receiver port B can drop these null flits (e.g., between B2 and B4) as they are received. The lanes can be turned off in a staggered manner until the lanes that are to be made idle are idle (e.g., between B3 to B4). In some implementations, the receiver device can turn the lanes off to realize the partial width link state. Flit data (e.g., 1325) can then recommence and can make use of the active lanes (e.g., lanes 0-7). In some implementations, L0p is logically similar to full width operating states (e.g., L0) with link timers, alignments and latencies remaining the same as in the preceding L0 state.

In some implementations, L0c windows and codes can also be used to trigger an exit from an L0p or other state to reactive idle lanes. Turning, for instance, to the examples of FIG. 14, a simplified flow diagram 1400 is shown illustrating an example exit from an L0p state (such as the L0p state entered in the example of FIG. 13). In the particular example of FIG. 14, flit data (e.g., 1405) can be sent prior to an L0c window 1410. An L0 entry (or L0p exit) request can be sent within the interval 1410, prompting the ports A and B to prepare for exiting the L0p state. After the close of the L0c interval 1410, additional flits 1415 can be sent prior to the point at which the L0p exit is to occur. As in other examples, an L0c code 1410 can include identification of or implicitly identify a time at which a state transition is to begin/end as well as particular events of the state transition. Flits (e.g., 1415) can continue to be sent to maximize data transfer while the devices anticipate beginning the state transition.

In one example, a defined L0p supersequence 1420 can be sent to being transitioning each of the idle lanes. The supersequence can include an EIEOS (or other data such another EOS) that can be sent to begin conditioning the lanes (e.g., lanes 8-19) that are to transition from idle to active. In some instances, such inactive lanes may have been inactive for some time and waking the lanes can introduce electrical transients and other instability. Further, to prevent against irregularities stemming from the re-awakening of the idle lanes negatively impacting the active lanes, the active lanes can be synchronized to send null flits (e.g., at 1425) at or immediately prior to the sending of the L0p exit supersequences (e.g., 1420) on the waking lanes.

Figure 14:
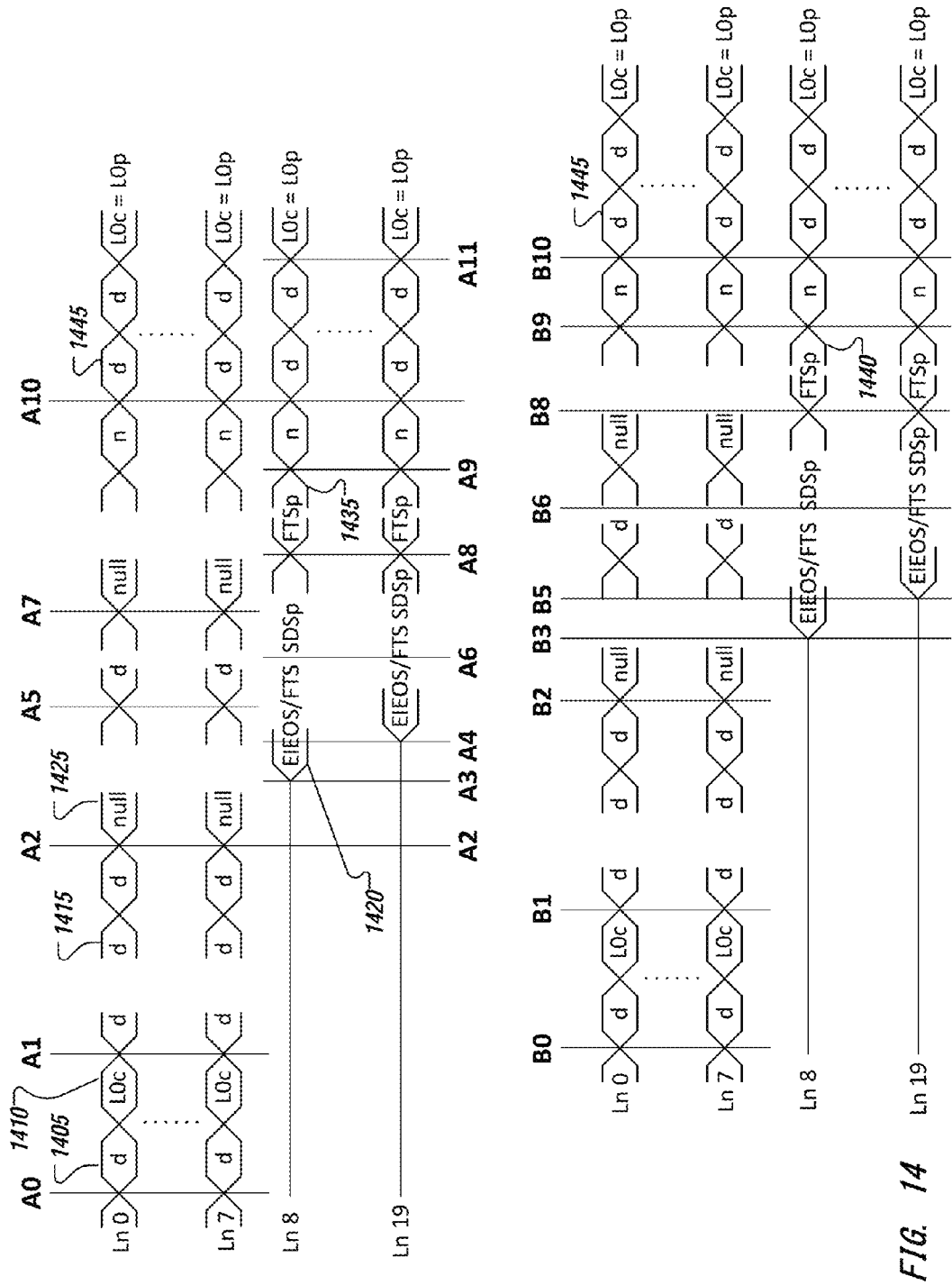
FIG. 14 illustrates an example transition from a partial width state.

In some instances, the exit from the partial width state can be accomplished without use of an L0c interval or state. Instead, a transmitter (e.g., port A of Device X 1210) can initiate the exit by simply sending the pre-defined pattern, or supersequence, that indicates the exit from the partial width state (e.g., to a full width state). The supersequence can be further defined to possess characteristics for use in training and deskewing the idle lanes as they awake to active. Further, in some implementations, the idle lanes can be woken in a staggered fashion, such that the exit supersequence is launched on each lane in a staggered manner, such as shown in the example of FIG. 14. In one implementation, the exit supersequence can begin with an EIEOS, which can be detected (e.g., by port B of Device Y 1220) and debounced to signal that the corresponding lane is ready to proceed with entry to an active state (e.g., L0). Debounce details can be design-specific but failure to successfully debounce all idle lanes in a timely manner may result in link reset or CRC errors at the link layer. The supersequence can end with the sending of an SDS and partial FTS (FTSp) on the idle lanes. The SDS and FTSp can be used to deskew the full complement of lanes.

In some implementations, the EIEOS can be extended within the exit supersequence in order to speed the detection of break from idle. This is followed by an FTS pattern that is designed for quick bitlock. In some implementations, the FTS can be a 16 byte control sequence and can have varying values for each lane of the link. For instance, each lane can use a staggered, or rotated, version of the FTS. Accordingly, the unique pattern in the FTS can be used to bytelock the idle lanes. The supersequence can be used to further used to deskew the reactivated lanes against the active lanes. This can be accomplished by either adding or subtracting latency from the previously idle lanes. To deskew, the idle lanes use a uniquely occurring pattern in an SDS. In one example, a special SDS, or "SDSp", can be provided for exits from the partial width state. The end of the SDSp pattern can align with a clean flit boundary at the transmitter of the SDSp. In some implementations, a clean flit boundary can occur every 48 UI after L0c (e.g., 2 whole flits on an 8 lane link or 5 whole flits on a 20 lane link). In order to do this, the FTS prior to the SDSp is to be truncated (shown in FIG. 9 as "FTSe"). After deskew, the link width can return to the full width on a subsequent clean flit boundary. During this interim period, full and/or partial FTSes (shown as "FTSp" (1435)) will be sent on the idle lanes.

Turning momentarily to the example of FIG. 9, example L0p exit sequences 915 are represented. As lanes are to remain active before and after such a transition, a premium can be placed on accelerating the state transition so as to provide minimal disruption to the active lanes. In one example, a partial supersequence can be sent (e.g., as in 1420 of FIG. 14) without the subsequent training sequences to expedite debouncing. For instance, transients can be attempted to be resolved within the first EIEOS without waiting another 1 KUI for a second complete EIEOS to be sent to begin bit lock, byte lock, deskew, and other tasks. Further the full partial width transmitting state exit supersequence can include a repeating sequence of an EOS (e.g., EIEOS) followed by a predefined number of training sequences. In the example of FIG. 9, an EIEOS can be sent followed by a series of training sequence (e.g., seven consecutive training sequences). In one implementation, rather than sending a full training sequence (such as a "TS" used in supersequences 905, 910) an abbreviated "fast training sequence" (or FTS) can be sent. The symbols of the FTS can be optimized to assist with the quick bit and byte lock and deskewing of the reactivated lanes, among other features. In one example, the FTS can be less than 128 UI in length (e.g., 48 UI). Further, FTSes can be left unscrambled so as to further assist in quick recovery of the idle lanes. As shown in the third row of element 915, a partial width transmitting state exit supersequence can also be interrupted by an SDS (e.g., an SDSp) once a controller has determined that the reactivated lanes have been effectively initialized. In one example, a partial FTS (or FTSp) can follow the SDSp to assist with synchronizing the reactivated lane with the active lanes (e.g., once bit lock, byte lock, and deskewing have been completed). For instance, the bit length of the FTSp can be set to correspond to a clean flit boundary to re-align the reactivated lanes and the active lanes. To facilitate fast synchronization of the lane, bits can be added or subtracted from a lane at the receiver prior or during the FTSp to account for the skew. Alternatively, or in addition, bits can also be added or subtracted to the lane at the receiver prior or during the SDS to facilitate deskewing of a newly activated lane, among other examples.

FIG. 15 is a representation 1500 of an example implementation of an SDSp. Byte 0 can be identical to the byte 0 of a normal SDS (e.g., 0xE1) and middle bytes (e.g., bytes 1-12) can repeat the value 0xAA. Unlike other SDS signals, the SDSp signal can include additional data to indicate the number of bytes that have passed on the lane since the end (or, in alternative implementations, the beginning) of the preceding L0c interval. For instance, bytes 13-15 of the SDSp can include a value BNb·BN, where BN is the 12-bit value indicating the number of bytes and BNb is the bit-wise complement of BN. In one example, BN can be encoded in byte 13 and the first nibble of byte 14 and BNb can be encoded in byte 15 and the second nibble of byte 14. Other formats and patterns for SDSp can be provided in alternative implementations, including alternatives that also indicate the number of bytes since a known planetary alignment signal, control interval, etc.

During deskew, it may not be apparent if the idle lane latency should be decreased or increased to line up with the clean flit boundary. The byte number of SDSp can be provided to indicate whether the skew is forward or backward. On the receiver, there may be either backward or forward skew between the active and idle lanes. The receiver can use the byte number indicated in the SDSp to identify the 12-bit ordinal number of the byte on active lanes measured from the previous L0c that coincides with the last byte of SDSp on the idle lanes. BNb can be provided as redundancy to protect against errors. The receiver can use the byte number to decide which flit boundary the idle lanes are to line up to and use the FTSp (e.g., at 1440) to align the waking idle lanes as the receiver exits the partial width state.

In some cases, any failure during the L0p exit sequence, such as a mismatch of BN and BNb, unexpected receiver actions (e.g., deskew not being completed prior to L0p timeout), or other errors can cause flit transfers to the link layer to stop and the link can be reset (such as on the next L0c occurrence). Returning to the discussion of FIG. 14, transmission of data flits can be resumed on active lanes (e.g., lanes 0 through n) (e.g., at 1425) while initialization of the waking lanes completes in some examples. For instance, once debouncing has been resolved, link layer transmissions can resume. In some instances, flit transmission can be momentarily interrupted by sending one or more null flits (e.g., between A9 and A10 and between B9 and B10) in connection with the final reactivation and synchronization of the previously idle lanes (e.g., lanes n+1 through z) (e.g., in connection with the sending of an FTSp 1435). With the lanes restored, flit data (e.g., 1445) can then resume on all lanes.

Turning to FIGS. 16A-16B, an example transition to an inactive state, such as an "L1" state, is illustrated. L1 is a lower power state than L0p since signaling is stopped on all lanes and in both directions. In this example, Device Y (e.g. 1220) (using Port C) initiates the inactive state by sending a request to enter L1 (e.g., "QL1") within an L0c window 1605. In other examples, Device X (e.g. 1210) can initiate the transition to L1, or both devices (e.g., X and Y) can initiate the L1 entry. If device (or "agent") X is ready to enter L1, it sends the L1 entry request QL1 (as an ACK) during its next L0c interval and proceeds to enter L1 at Port D (ahead of Port C) and further causes its transmitter port (e.g., Port A) to initiate entry into L1 as shown in FIG. 16B. Port logic can cause the lanes to go to idle in a staggered manner, as shown in FIGS. 16A and 16B. Further, flits sent before and the flits sent after sending a QL1 (or NAK) can be null flits ("Ni") (e.g., LLCTRL-NULL flits).

In some implementations, an L1 state can be provided with a minimum residency duration (e.g., measured in UI, time, flit boundaries, etc.). The minimum residency duration can be defined to assist in facilitating an eventual graceful wake up (in connection with corresponding L1 exit signaling. During the minimum residency period, devices are to ignore all signaling. In one implementation, the minimum residency period can correspond to a period of L0c plus the time in reset and transmitter calibration states. The minimum L1 residency time can be defined such that it is not to be violated (e.g., a cause premature re-entry to active or partially active (e.g., L0p) states. In the example of FIGS. 16A-16B, a minimum residency duration is represented by the duration between A1 and A4 or D1 and D4.

One or more power control units (PCU) can be provided to assist in timing transitions between an L0 state and lower power states, such as L0p and L1. Further, HPI can support master-slave, master-master and other architectures. For instance, a PCU may be present on or otherwise be associated with only one of the devices connected on a link and the device having the PCU can be considered the master. Master-master configurations can be realized, for instance, when both devices have an associated PCU which can prompt a link state transition, among other example implementations. Some implementations can specify a minimum residency duration for a particular low power state, such as L0p or L1, for example, to attempt to minimize transitions between states and attempt to maximize power savings within an entered low power state (as described above).

In some cases, a receiving port may not be ready to enter a low power, idle state. For instance, if a device receives an L1 entry request from another device coupled to it on a link, the receiving device can reply with a negative acknowledgement (NAK). In some implementations, in addition to a minimum residency duration, a retry period can be defined such that a device (agent) that sent an L1 request cannot re-send another L1 request before the expiration of the retry period. Accordingly, the agent can include timer or counter logic to determine when the retry period has expired and the L1 entry request can be retried. In one example, the retry period can be defined to cover at least two L0c intervals, among other examples. This retry period can be provided, for instance, to give the receiver "breathing room" to take other actions that might be beneficial before fielding and considering another L1 entry request. For instance, in some implementations, because of the power savings provided through the L1 state, L1 entry requests may be given priority over other requests, such as requests to enter L0p. Accordingly, a request to enter L0p, or another request over which L1 requests have priority, may be blocked if an L1 request is repeatedly retried, because the device receiving the L1 request may be forced to use its L0c windows to respond (e.g., with NAKs) to the repeating L1 entry requests.

To illustrate, FIGS. 17A-17B show flow diagrams 1700a,b representing example interactions between Device X and Device Y. FIG. 17A represents a case, as in FIGS. 16A-16B, where a transmitting device (e.g., 1705) sends an L1 entry request 1715 to a receiving device within an L0c window, and the receiving device 1710 responds with an acknowledgement by sending an L1 request (at 1730) in the next L0c window. Null flits 1720, 1735 are sent immediately after the requests 1715, 1730. Additionally, data flits 1725 can continue to be sent by the receiving device 1710 while the receiving device 1710 waits for the next L0c interval to provide its response (e.g., 1730).

FIG. 17B shows an example where a retry period can be employed to allow a receiving device to propose an alternative action to a higher priority L1 request. In this example, both Device X and Device Y attempt to send requests during a L0c window. For instance, Device Y may send a NOP 1755 in the L0c window and Device X may send an L1 entry request 1750. A null flit 1760 can be sent by the transmitter 1705 following the request 1750. Following the L0c window, Device Y, may continue to send flits 1765. If Device Y desires to enter an L0p state (and keep some lanes active), it can reply to the request to enter L1 1750 with a NAK in the next L0c window (e.g., at 1770) and then continue sending normal flits 1775. Device X 1705, upon sending request 1750 (or alternatively receiving the NAK 1770) can start a timer in response such that it does not send another L1 entry request for a predetermined retry period (e.g., $t_r$ (1780)). Accordingly, upon receiving the NAK 1770, rather than re-sending an L1 entry request in the following L0c window (and forcing Device Y to again respond to the request rather than sending requests of its own), a retry period 1780 can be allowed to provide Device Y 1710 a limited window (corresponding to $t_r$ (1780)) to send requests (e.g., within a L0c window) with lower priority than an L1 entry request. For instance, Device Y 1710 can re-send an L0p entry request within a subsequent L0c window (followed by narrow data flits 1790). Narrow data flits can be flits sent on fewer than all lanes of a link (e.g., 8 lanes instead of 20). Additionally, following the expiration of retry period 1780, Device X 1705 can again attempt to send its L1 entry request, among other examples.

As introduced above, a BLS or L0c window can be utilized to communicate various control codes, signals, and other data, including within test, initialization, and error checking applications. A predefined set of BLS codes can be defined that can be communicated within the brief window of UIs provided through BLS. However, transients, transmission line irregularities, and other factors can result in bit errors that can potentially cause the control codes to be corrupted or misinterpreted. Logic can be provided on agents on a link to perform some degree of error detection and correction to account for more minor errors in interpreting and processing control codes. If the logic is still unable to make sense of definitively resolve a control code error, a mismatch can result. In some implementations of HPI, features can be provided to respond to the potential catastrophic side effects of a mismatch. For instance, in one embodiment, upon detection of a mismatch, a link can be suspended, including the sending of potentially corrupted flits, adaptation, and other communications. The link can then be automatically transitioned into a reset mode at the end of the next BLS (or L0c) interval, among other examples.

Further, errors can occur in link transition requests. For example, a device requesting entry to L1 may be restricted from sending an additional L1 entry request until an ACK or NAK is received for the previous L1 entry request. Further, a device receiving an L1 entry request may be directed to provide a response in the very next L0c window. Failure to adhere to these rules (or other link transition handshaking rules) can cause an in-band reset or other action. This can cause both devices to be synchronously reset, among other remedies.

Some systems and devices utilizing HPI can be deterministic such that their transactions and interactions with other systems, including communications over an HPI link, are synchronized with particular events on the system or device. Such synchronization can take place according to a planetary alignment point or signal corresponding to the deterministic events. For instance, a planetary alignment signal can be used to synchronize state transitions, including entry into a link transmitting state, with other events on the device. In some instances, sync counters can be employed to maintain alignment with a planetary alignment of a device. For instance, each agent can include a local sync counter which is initialized by a planetary aligned signal (i.e., common and simultaneous (except for fixed skew) to all agents/layers which are in sync). This sync counter can count alignment points correctly even in powered down or low-power states (e.g., L1 state) and can be used to time the initialization process (after reset or L1 exit), including the boundaries (i.e., beginning or end) of an EIEOS (or other EOS included in a supersequence utilized during initialization. Such supersequences can be fixed in size and greater than max possible latency on a link. EIEOS-TS boundaries in a supersequence can thus be used as a proxy for a remote sync counter value.

Further, HPI can support master-slave models where a deterministic master device or system can drive timing of interaction with another device according to its own planetary alignment moments. Further, in some examples, master-master determinism can be supported. Master-master or master slave determinism can ensures that two or more link-pairs can be in lock-step at the Link layer and above. In master-master determinism, each direction's exit from initialization can be controlled by respective transmitter. In the case of master-slave determinism, a master agent can controls the determinism of the link pair (i.e., in both directions) by making a slave transmitter initialization exit wait for its receiver to exit initialization, for instance, among other potential examples and implementations.

In some implementations, a synchronization (or "sync") counter can be utilized in connection with maintaining determinism within an HPI environment. For instance, a sync counter may be implemented to count a defined amount, such as 4096 UI. This sync counter may be reset by an asynchronous event and may count continuously (with rollover) from then (potentially even during a low power link state). Pin-based resets (e.g., power on reset, warm reset) may be synchronizing events that reset a sync counter, among other example. In one embodiment, these events can occur at two sides with skew less (and, in many cases, much less) than the sync counter value. During initialization, the start of the transmitted exit ordered set (e.g., EIEOS) preceding a training sequence of a training supersequence may be aligned with the reset value of the sync counter (e.g., sync counter rollover). Such sync counters can be maintained at each agent on a link so as to preserve determinism through maintaining constant latency of flit transmissions over a particular link.

Control sequences and codes, among other signals, can be synchronized with a planetary alignment signal. For instance, EIEOS sequences, BLS or L0c windows (and included codes), SDSes, etc. can be configured to be synchronized to a planetary alignment. Further, synchronization counters can be reset according to an external signal, such as a planetary alignment signal from a device so as to itself be synchronized with the planetary alignment, among other examples.

As noted above, a state exit can be take place according to a planetary alignment point. For instance, an SDS can be sent to interrupt a state supersequence can to drive transition from the state to another state. The sending of the SDS can be timed to coincide with a planetary alignment point and, in some cases, in response to a planetary alignment signal. In other instances, the sending of an SDS can be synchronized with a planetary alignment point based on a sync counter value or other signal synchronized to the planetary alignment. An SDS can be sent at any point in a supersequence, in some cases, interrupting a particular TS or EIEOS, etc. of the supersequence. This can ensure that the state transitions with little delay while retaining alignment with a planetary alignment point, among other examples.

It should be appreciated that other details and features can be provided in a high-performance interconnect. For instance, a high-performance interconnect can apply one or more features and principles described in U.S. patent application Ser. No. 14/060,191, entitled "High Performance Interconnect," which is incorporated herein by reference.

HPI can be incorporated in any variety of computing devices and systems, including mainframes, server systems, personal computers, mobile computers (such as tablets, smartphones, personal digital systems, etc.), smart appliances, gaming or entertainment consoles and set top boxes, among other examples. For instance, referring to FIG. 18, an embodiment of a block diagram for a computing system including a multicore processor is depicted. Processor 1800 includes any processor or processing device, such as a microprocessor, an embedded processor, a digital signal processor (DSP), a network processor, a handheld processor, an application processor, a co-processor, a system on a chip (SOC), or other device to execute code. Processor 1800, in one embodiment, includes at least two cores—core 1801 and 1802, which may include asymmetric cores or symmetric cores (the illustrated embodiment). However, processor 1800 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Figure 18:
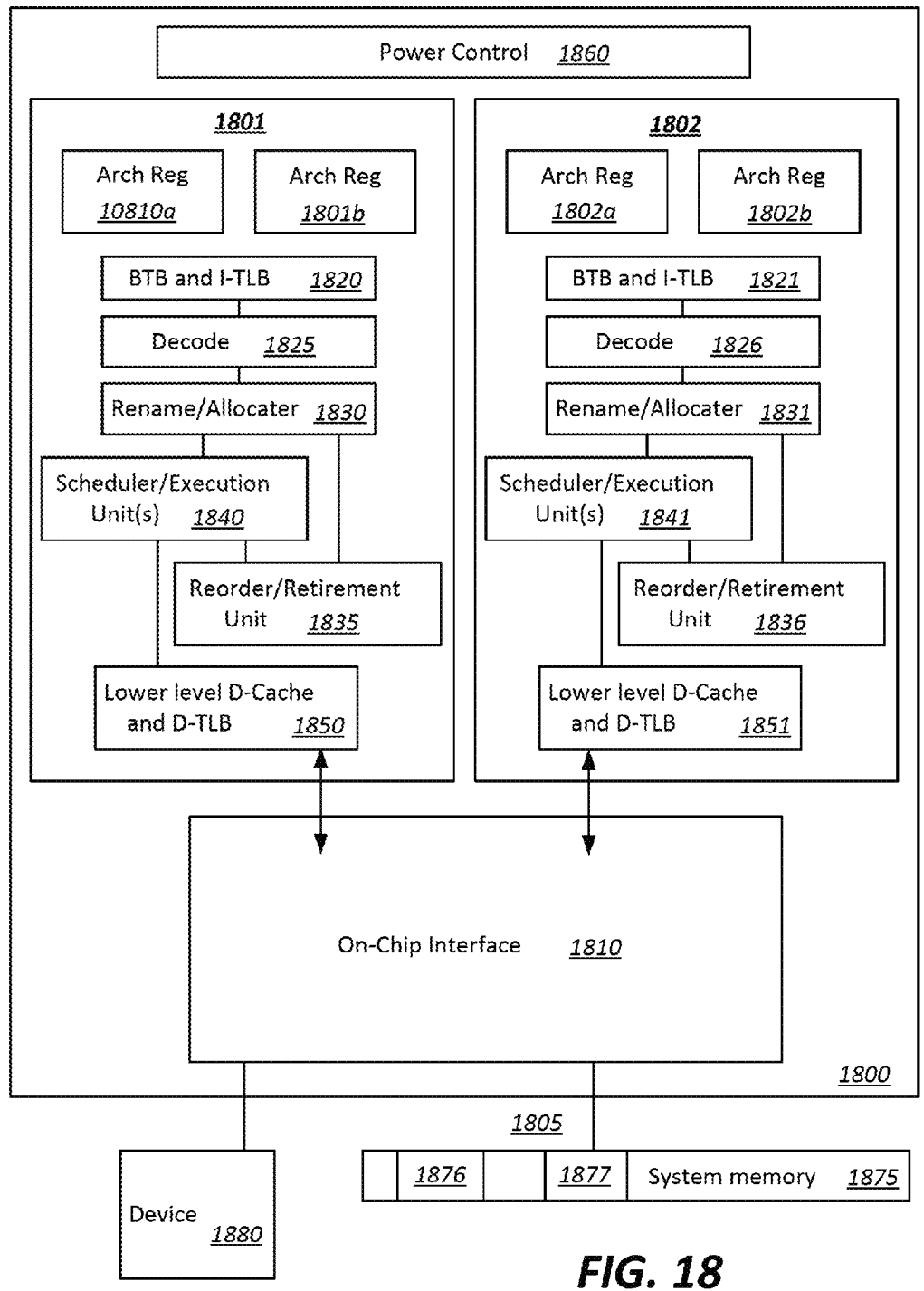
FIG. 18 illustrates an embodiment of a block diagram for a computing system including a multicore processor.

Physical processor 1800, as illustrated in FIG. 18, includes two cores—core 1801 and 1802. Here, core 1801 and 1802 are considered symmetric cores, i.e. cores with the same configurations, functional units, and/or logic. In another embodiment, core 1801 includes an out-of-order processor core, while core 1802 includes an in-order processor core. However, cores 1801 and 1802 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1801 are described in further detail below, as the units in core 1802 operate in a similar manner in the depicted embodiment.

As depicted, core 1801 includes two hardware threads 1801a and 1801b, which may also be referred to as hardware thread slots 1801a and 1801b. Therefore, software entities, such as an operating system, in one embodiment potentially view processor 1800 as four separate processors, i.e., four logical processors or processing elements capable of executing four software threads concurrently. As alluded to above, a first thread is associated with architecture state registers 1801a, a second thread is associated with architecture state registers 1801b, a third thread may be associated with architecture state registers 1802a, and a fourth thread may be associated with architecture state registers 1802b. Here, each of the architecture state registers (1801a, 1801b, 1802a, and 1802b) may be referred to as processing elements, thread slots, or thread units, as described above. As illustrated, architecture state registers 1801 a are replicated in architecture state registers 1801b, so individual architecture states/contexts are capable of being stored for logical processor 1801a and logical processor 1801b. In core 1801, other smaller resources, such as instruction pointers and renaming logic in allocator and renamer block 1830 may also be replicated for threads 1801a and 1801b. Some resources, such as re-order buffers in reorder/retirement unit 1835, ILTB 1820, load/store buffers, and queues may be shared through partitioning. Other resources, such as general purpose internal registers, page-table base register(s), low-level data-cache and data-TLB 1815, execution unit(s) 1840, and portions of out-of-order unit 1835 are potentially fully shared.

Processor 1800 often includes other resources, which may be fully shared, shared through partitioning, or dedicated by/to processing elements. In FIG. 18, an embodiment of a purely exemplary processor with illustrative logical units/resources of a processor is illustrated. Note that a processor may include, or omit, any of these functional units, as well as include any other known functional units, logic, or firmware not depicted. As illustrated, core 1801 includes a simplified, representative out-of-order (OOO) processor core. But an in-order processor may be utilized in different embodiments. The OOO core includes a branch target buffer 1820 to predict branches to be executed/taken and an instruction-translation buffer (I-TLB) 1820 to store address translation entries for instructions.

Core 1801 further includes decode module 1825 coupled to fetch unit 1820 to decode fetched elements. Fetch logic, in one embodiment, includes individual sequencers associated with thread slots 1801a, 1801b, respectively. Usually core 1801 is associated with a first ISA, which defines/specifies instructions executable on processor 1800. Often machine code instructions that are part of the first ISA include a portion of the instruction (referred to as an opcode), which references/specifies an instruction or operation to be performed. Decode logic 1825 includes circuitry that recognizes these instructions from their opcodes and passes the decoded instructions on in the pipeline for processing as defined by the first ISA. For example, as discussed in more detail below decoders 1825, in one embodiment, include logic designed or adapted to recognize specific instructions, such as transactional instruction. As a result of the recognition by decoders 1825, the architecture or core 1801 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1826, in one embodiment, recognize the same ISA (or a subset thereof). Alternatively, in a heterogeneous core environment, decoders 1826 recognize a second ISA (either a subset of the first ISA or a distinct ISA).

In one example, allocator and renamer block 1830 includes an allocator to reserve resources, such as register files to store instruction processing results. However, threads 1801a and 1801b are potentially capable of out-of-order execution, where allocator and renamer block 1830 also reserves other resources, such as reorder buffers to track instruction results. Unit 1830 may also include a register renamer to rename program/instruction reference registers to other registers internal to processor 1800. Reorder/retirement unit 1835 includes components, such as the reorder buffers mentioned above, load buffers, and store buffers, to support out-of-order execution and later in-order retirement of instructions executed out-of-order.

Scheduler and execution unit(s) block 1840, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1850 are coupled to execution unit(s) 1840. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1801 and 1802 share access to higher-level or further-out cache, such as a second level cache associated with on-chip interface 1810. Note that higher-level or further-out refers to cache levels increasing or getting further way from the execution unit(s). In one embodiment, higher-level cache is a last-level data cache—last cache in the memory hierarchy on processor 1800—such as a second or third level data cache. However, higher level cache is not so limited, as it may be associated with or include an instruction cache. A trace cache—a type of instruction cache—instead may be coupled after decoder 1825 to store recently decoded traces. Here, an instruction potentially refers to a macro-instruction (i.e. a general instruction recognized by the decoders), which may decode into a number of micro-instructions (micro-operations).

In the depicted configuration, processor 1800 also includes on-chip interface module 1810. Historically, a memory controller, which is described in more detail below, has been included in a computing system external to processor 1800. In this scenario, on-chip interface 1810 is to communicate with devices external to processor 1800, such as system memory 1875, a chipset (often including a memory controller hub to connect to memory 1875 and an I/O controller hub to connect peripheral devices), a memory controller hub, a northbridge, or other integrated circuit. And in this scenario, bus 1805 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1875 may be dedicated to processor 1800 or shared with other devices in a system. Common examples of types of memory 1875 include DRAM, SRAM, non-volatile memory (NV memory), and other known storage devices. Note that device 1880 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1800. For example in one embodiment, a memory controller hub is on the same package and/or die with processor 1800. Here, a portion of the core (an on-core portion) 1810 includes one or more controller(s) for interfacing with other devices such as memory 1875 or a graphics device 1880. The configuration including an interconnect and controllers for interfacing with such devices is often referred to as an on-core (or un-core configuration). As an example, on-chip interface 1810 includes a ring interconnect for on-chip communication and a high-speed serial point-to-point link 1805 for off-chip communication. Yet, in the SOC environment, even more devices, such as the network interface, co-processors, memory 1875, graphics processor 1880, and any other known computer devices/interface may be integrated on a single die or integrated circuit to provide small form factor with high functionality and low power consumption.

In one embodiment, processor 1800 is capable of executing a compiler, optimization, and/or translator code 1877 to compile, translate, and/or optimize application code 1876 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 19:
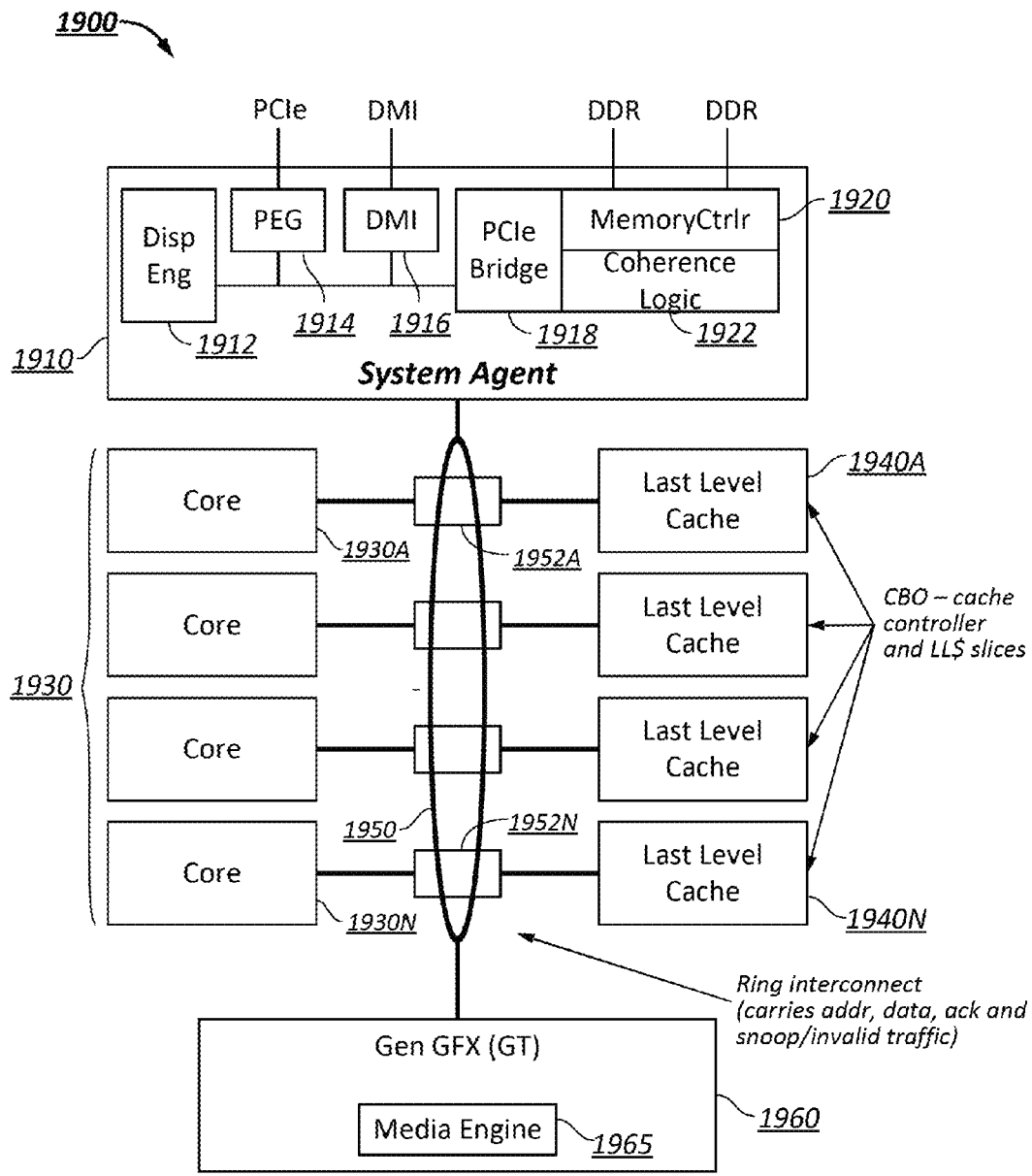
FIG. 19 illustrates another embodiment of a block diagram for a computing system including a multicore processor.

Referring now to FIG. 19, shown is a block diagram of an embodiment of a multicore processor. As shown in the embodiment of FIG. 19, processor 1900 includes multiple domains. Specifically, a core domain 1930 includes a plurality of cores 1930A-1930N, a graphics domain 1960 includes one or more graphics engines having a media engine 1965, and a system agent domain 1910.

In various embodiments, system agent domain 1910 handles power control events and power management, such that individual units of domains 1930 and 1960 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 1930 and 1960 may operate at different voltage and/or power, and furthermore the individual units within the domains each potentially operate at an independent frequency and voltage. Note that while only shown with three domains, understand the scope of the present invention is not limited in this regard and additional domains may be present in other embodiments.

As shown, each core 1930 further includes low level caches in addition to various execution units and additional processing elements. Here, the various cores are coupled to each other and to a shared cache memory that is formed of a plurality of units or slices of a last level cache (LLC) 1940A-1940N; these LLCs often include storage and cache controller functionality and are shared amongst the cores, as well as potentially among the graphics engine too.

As seen, a ring interconnect 1950 couples the cores together, and provides interconnection between the core domain 1930, graphics domain 1960 and system agent circuitry 1910, via a plurality of ring stops 1952A-1952N, each at a coupling between a core and LLC slice. As seen in FIG. 19, interconnect 1950 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, On-chip System Fabric (OSF), an Advanced Microcontroller Bus Architecture (AMBA) interconnect, a multi-dimensional mesh fabric, or other known interconnect architecture) may be utilized in a similar fashion.

As further depicted, system agent domain 1910 includes display engine 1912 which is to provide control of and an interface to an associated display. System agent domain 1910 may include other units, such as: an integrated memory controller 1920 that provides for an interface to a system memory (e.g., a DRAM implemented with multiple DIMMs; coherence logic 1922 to perform memory coherence operations. Multiple interfaces may be present to enable interconnection between the processor and other circuitry. For example, in one embodiment at least one direct media interface (DMI) 1916 interface is provided as well as one or more PCIe™ interfaces 1914. The display engine and these interfaces typically couple to memory via a PCIe™ bridge 1918. Still further, to provide for communications between other agents, such as additional processors or other circuitry, one or more other interfaces may be provided.

Figure 20:
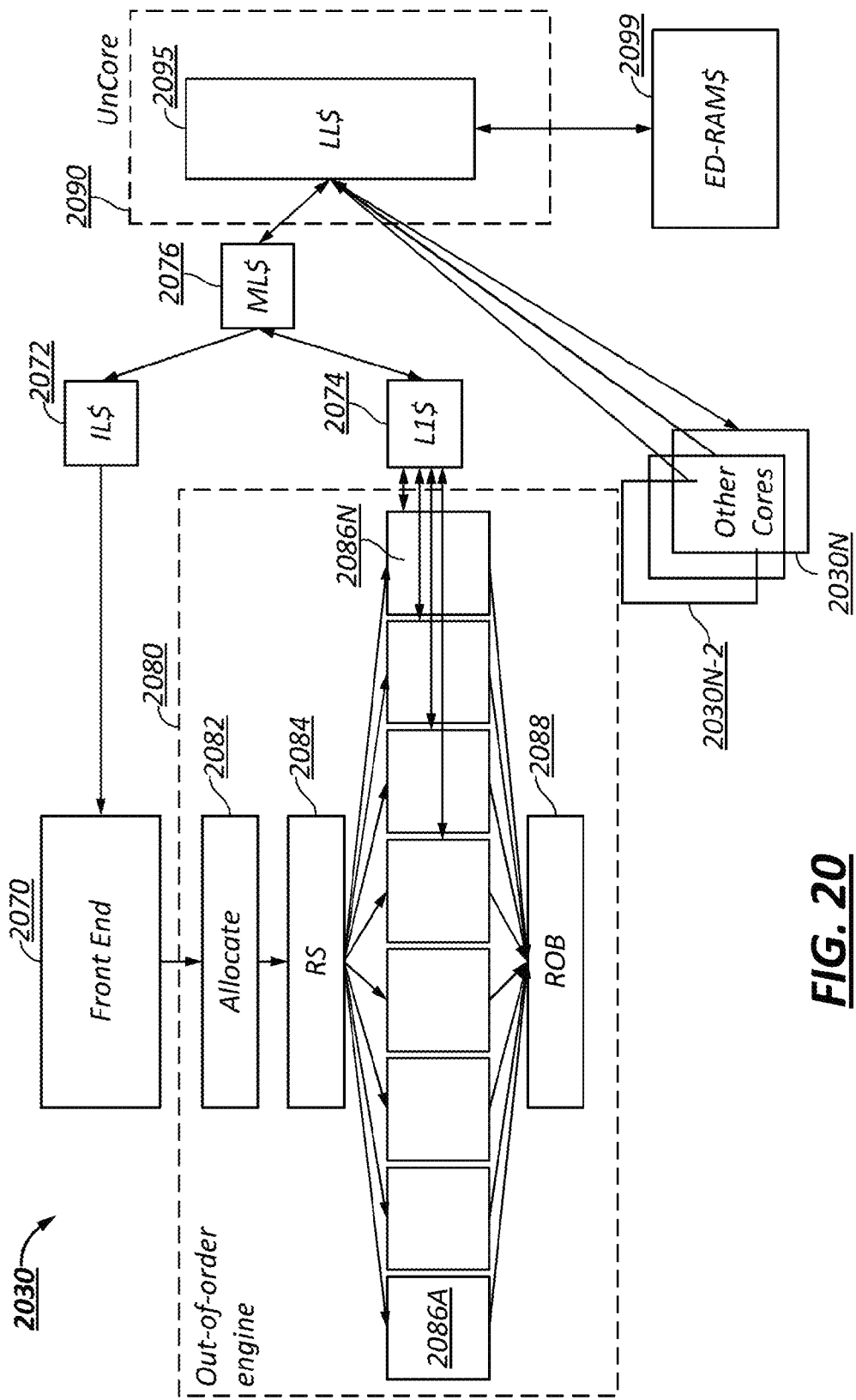
FIG. 20 illustrates an embodiment of a block diagram for a processor.

Referring now to FIG. 20, shown is a block diagram of a representative core; specifically, logical blocks of a back-end of a core, such as core 4030 from FIG. 40. In general, the structure shown in FIG. 20 includes an out-of-order processor that has a front end unit 2070 used to fetch incoming instructions, perform various processing (e.g. caching, decoding, branch predicting, etc.) and passing instructions/operations along to an out-of-order (OOO) engine 2080. OOO engine 2080 performs further processing on decoded instructions.

Specifically in the embodiment of FIG. 20, out-of-order engine 2080 includes an allocate unit 2082 to receive decoded instructions, which may be in the form of one or more micro-instructions or uops, from front end unit 2070, and allocate them to appropriate resources such as registers and so forth. Next, the instructions are provided to a reservation station 2084, which reserves resources and schedules them for execution on one of a plurality of execution units 2086A-2086N. Various types of execution units may be present, including, for example, arithmetic logic units (ALUs), load and store units, vector processing units (VPUs), floating point execution units, among others. Results from these different execution units are provided to a reorder buffer (ROB) 2088, which take unordered results and return them to correct program order.

Still referring to FIG. 20, note that both front end unit 2070 and out-of-order engine 2080 are coupled to different levels of a memory hierarchy. Specifically shown is an instruction level cache 2072, that in turn couples to a mid-level cache 2076, that in turn couples to a last level cache 2095. In one embodiment, last level cache 2095 is implemented in an on-chip (sometimes referred to as uncore) unit 2090. As an example, unit 2090 is similar to system agent 1910 of FIG. 19. As discussed above, uncore 2090 communicates with system memory 2099, which, in the illustrated embodiment, is implemented via ED RAM. Note also that the various execution units 2086 within out-of-order engine 2080 are in communication with a first level cache 2074 that also is in communication with mid-level cache 2076. Note also that additional cores 2030N-2-2030N can couple to LLC 2095. Although shown at this high level in the embodiment of FIG. 20, understand that various alterations and additional components may be present.

Figure 21:
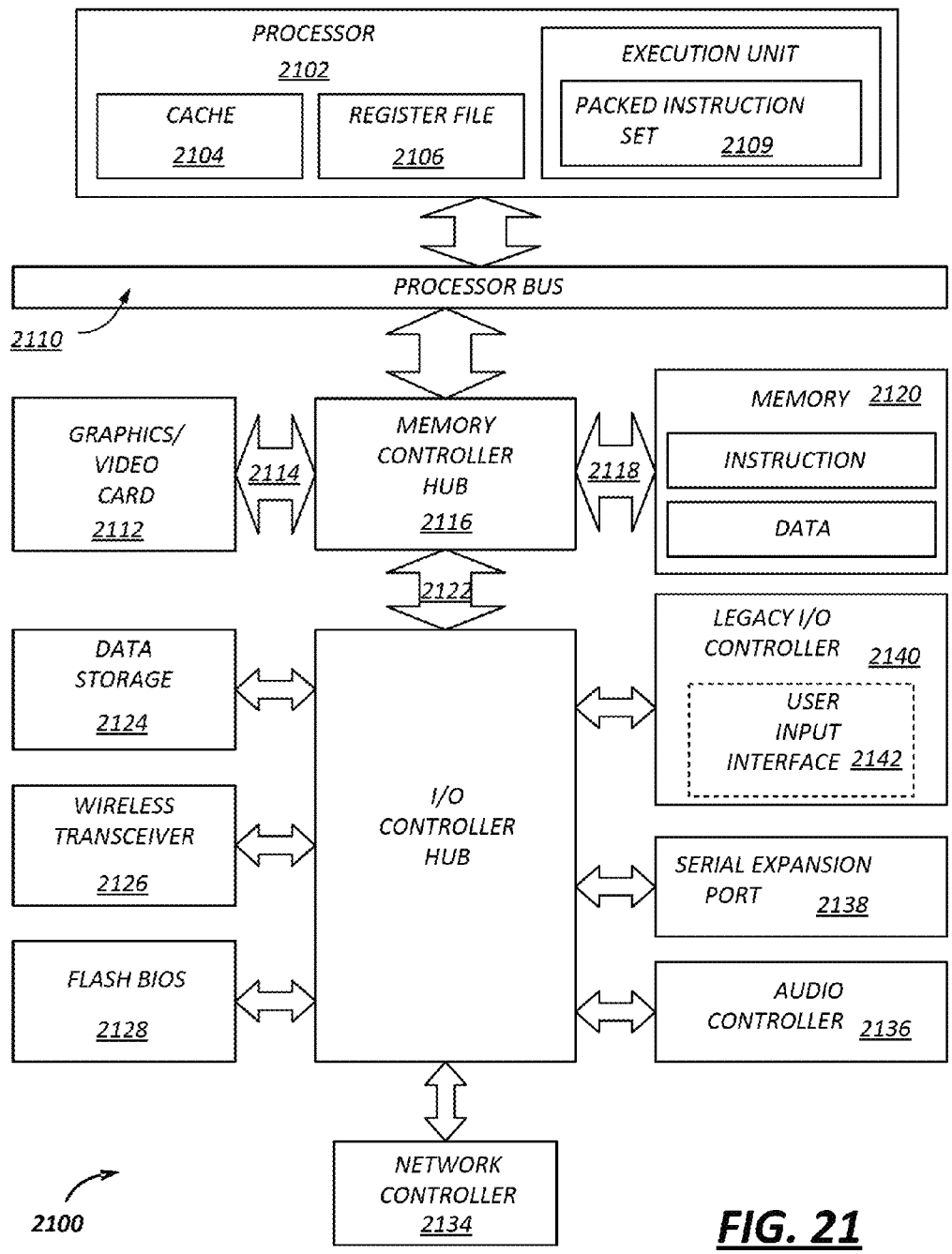
FIG. 21 illustrates another embodiment of a block diagram for a computing system including a processor.

Turning to FIG. 21, a block diagram of an exemplary computer system formed with a processor that includes execution units to execute an instruction, where one or more of the interconnects implement one or more features in accordance with one embodiment of the present invention is illustrated. System 2100 includes a component, such as a processor 2102 to employ execution units including logic to perform algorithms for process data, in accordance with the present invention, such as in the embodiment described herein. System 2100 is representative of processing systems based on the PENTIUM III™, PENTIUM 4™, Xeon™, Itanium, XScale™ and/or StrongARM™ microprocessors, although other systems (including PCs having other microprocessors, engineering workstations, set-top boxes and the like) may also be used. In one embodiment, sample system 2100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 2102 includes one or more execution units 2108 to implement an algorithm that is to perform at least one instruction. One embodiment may be described in the context of a single processor desktop or server system, but alternative embodiments may be included in a multiprocessor system. System 2100 is an example of a 'hub' system architecture. The computer system 2100 includes a processor 2102 to process data signals. The processor 2102, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 2102 is coupled to a processor bus 2110 that transmits data signals between the processor 2102 and other components in the system 2100. The elements of system 2100 (e.g. graphics accelerator 2112, memory controller hub 2116, memory 2120, I/O controller hub 2124, wireless transceiver 2126, Flash BIOS 2128, Network controller 2134, Audio controller 2136, Serial expansion port 2138, I/O controller 2140, etc.) perform their conventional functions that are well known to those familiar with the art.

In one embodiment, the processor 2102 includes a Level 1 (L1) internal cache memory 2104. Depending on the architecture, the processor 2102 may have a single internal cache or multiple levels of internal caches. Other embodiments include a combination of both internal and external caches depending on the particular implementation and needs. Register file 2106 is to store different types of data in various registers including integer registers, floating point registers, vector registers, banked registers, shadow registers, checkpoint registers, status registers, and instruction pointer register.

Execution unit 2108, including logic to perform integer and floating point operations, also resides in the processor 2102. The processor 2102, in one embodiment, includes a microcode (ucode) ROM to store microcode, which when executed, is to perform algorithms for certain macroinstructions or handle complex scenarios. Here, microcode is potentially updateable to handle logic bugs/fixes for processor 2102. For one embodiment, execution unit 2108 includes logic to handle a packed instruction set 2109. By including the packed instruction set 2109 in the instruction set of a general-purpose processor 2102, along with associated circuitry to execute the instructions, the operations used by many multimedia applications may be performed using packed data in a general-purpose processor 2102. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 2108 may also be used in micro controllers, embedded processors, graphics devices, DSPs, and other types of logic circuits. System 2100 includes a memory 2120. Memory 2120 includes a dynamic random access memory (DRAM) device, a static random access memory (SRAM) device, flash memory device, or other memory device. Memory 2120 stores instructions and/or data represented by data signals that are to be executed by the processor 2102.

Note that any of the aforementioned features or aspects of the invention may be utilized on one or more interconnect illustrated in FIG. 21. For example, an on-die interconnect (ODI), which is not shown, for coupling internal units of processor 2102 implements one or more aspects of the invention described above. Or the invention is associated with a processor bus 2110 (e.g. other known high performance computing interconnect), a high bandwidth memory path 2118 to memory 2120, a point-to-point link to graphics accelerator 2112 (e.g. a Peripheral Component Interconnect express (PCIe) compliant fabric), a controller hub interconnect 2122, an I/O or other interconnect (e.g. USB, PCI, PCIe) for coupling the other illustrated components. Some examples of such components include the audio controller 2136, firmware hub (flash BIOS) 2128, wireless transceiver 2126, data storage 2124, legacy I/O controller 2110 containing user input and keyboard interfaces 2142, a serial expansion port 2138 such as Universal Serial Bus (USB), and a network controller 2134. The data storage device 2124 can comprise a hard disk drive, a floppy disk drive, a CD-ROM device, a flash memory device, or other mass storage device.

Figure 22:
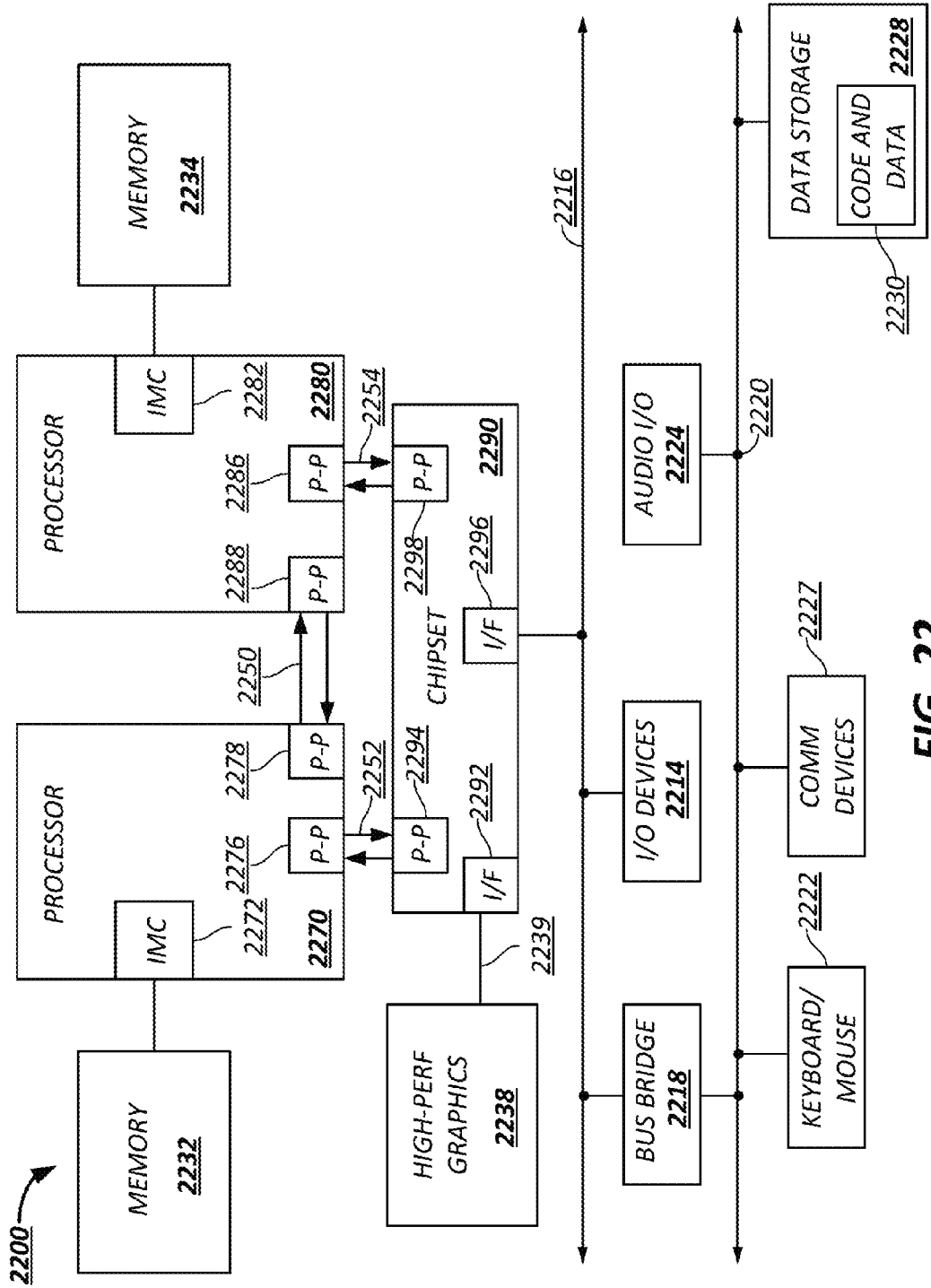
FIG. 22 illustrates an embodiment of a block for a computing system including multiple processor sockets.

Referring now to FIG. 22, shown is a block diagram of a second system 2200 in accordance with an embodiment of the present invention. As shown in FIG. 22, multiprocessor system 2200 is a point-to-point interconnect system, and includes a first processor 2270 and a second processor 2280 coupled via a point-to-point interconnect 2250. Each of processors 2270 and 2280 may be some version of a processor. In one embodiment, 2252 and 2254 are part of a serial, point-to-point coherent interconnect fabric, such as a high-performance architecture. As a result, the invention may be implemented within the QPI architecture.

While shown with only two processors 2270, 2280, it is to be understood that the scope of the present invention is not so limited. In other embodiments, one or more additional processors may be present in a given processor.

Processors 2270 and 2280 are shown including integrated memory controller units 2272 and 2282, respectively. Processor 2270 also includes as part of its bus controller units point-to-point (P-P) interfaces 2276 and 2278; similarly, second processor 2280 includes P-P interfaces 2286 and 2288. Processors 2270, 2280 may exchange information via a point-to-point (P-P) interface 2250 using P-P interface circuits 2278, 2288. As shown in FIG. 22, IMCs 2272 and 2282 couple the processors to respective memories, namely a memory 2232 and a memory 2234, which may be portions of main memory locally attached to the respective processors.

Processors 2270, 2280 each exchange information with a chipset 2290 via individual P-P interfaces 2252, 2254 using point to point interface circuits 2276, 2294, 2286, 2298. Chipset 2290 also exchanges information with a high-performance graphics circuit 2238 via an interface circuit 2292 along a high-performance graphics interconnect 2239.

A shared cache (not shown) may be included in either processor or outside of both processors; yet connected with the processors via P-P interconnect, such that either or both processors' local cache information may be stored in the shared cache if a processor is placed into a low power mode.

Chipset 2290 may be coupled to a first bus 2216 via an interface 2296. In one embodiment, first bus 2216 may be a Peripheral Component Interconnect (PCI) bus, or a bus such as a PCI Express bus or another third generation I/O interconnect bus, although the scope of the present invention is not so limited.

As shown in FIG. 22, various I/O devices 2214 are coupled to first bus 2216, along with a bus bridge 2218 which couples first bus 2216 to a second bus 2220. In one embodiment, second bus 2220 includes a low pin count (LPC) bus. Various devices are coupled to second bus 2220 including, for example, a keyboard and/or mouse 2222, communication devices 2227 and a storage unit 2228 such as a disk drive or other mass storage device which often includes instructions/code and data 2230, in one embodiment. Further, an audio I/O 2224 is shown coupled to second bus 2220. Note that other architectures are possible, where the included components and interconnect architectures vary. For example, instead of the point-to-point architecture of FIG. 22, a system may implement a multi-drop bus or other such architecture.

Figure 23:
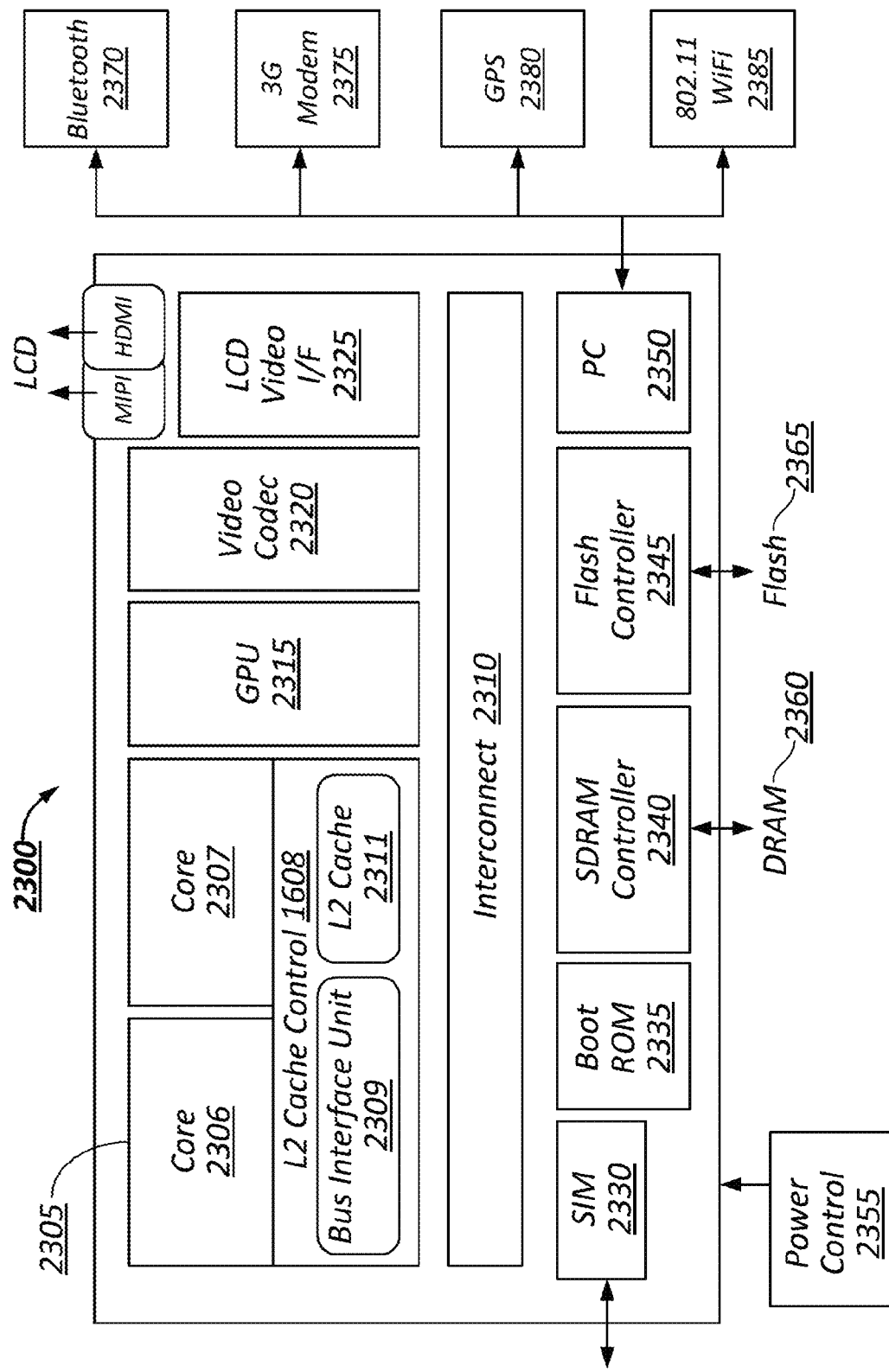
FIG. 23 illustrates another embodiment of a block diagram for a computing system.

Turning next to FIG. 23, an embodiment of a system on-chip (SOC) design in accordance with the inventions is depicted. As a specific illustrative example, SOC 2300 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 2300 includes 2 cores—2306 and 2307. Similar to the discussion above, cores 2306 and 2307 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 2306 and 2307 are coupled to cache control 2308 that is associated with bus interface unit 2309 and L2 cache 2311 to communicate with other parts of system 2300. Interconnect 2310 includes an on-chip interconnect, such as an IOSF, AMBA, or other interconnect discussed above, which potentially implements one or more aspects of described herein.

Interconnect 2310 provides communication channels to the other components, such as a Subscriber Identity Module (SIM) 2330 to interface with a SIM card, a boot rom 2335 to hold boot code for execution by cores 2306 and 2307 to initialize and boot SOC 2300, a SDRAM controller 2340 to interface with external memory (e.g. DRAM 2360), a flash controller 2345 to interface with non-volatile memory (e.g. Flash 2365), a peripheral control 2350 (e.g. Serial Peripheral Interface) to interface with peripherals, video codecs 2320 and Video interface 2325 to display and receive input (e.g. touch enabled input), GPU 2315 to perform graphics related computations, etc. Any of these interfaces may incorporate aspects of the invention described herein.

In addition, the system illustrates peripherals for communication, such as a Bluetooth module 2370, 3G modem 2375, GPS 2380, and WiFi 2385. Note as stated above, a UE includes a radio for communication. As a result, these peripheral communication modules are not all required. However, in a UE some form a radio for external communication is to be included.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, hardware- and/or software-based logic (e.g., a lane monitor), and a method to send a supersequence to another device to indicate a transition from a partial width link state to another active link state. The supersequence is to be sent over one or more lanes of a link and is to include at least a portion of a start of data sequence (SDS) to include a predefined sequence and a byte number value. The byte number value is to indicate a number of bytes measured from a preceding control interval.

In at least one example, the supersequence is further to include an electrical ordered set and one or more training sequences.

In at least one example, the supersequence is to end with the SDS.

In at least one example, the electrical ordered set is to be used to condition the lane, the one or more training sequences are to facilitate byte lock and deskewing of the lanes, and the SDS is to align with a clean flit boundary.

In at least one example, the predefined sequence is to include a first portion to include a first set of bytes each with a first value, and a second portion to include a second set of bytes each with a different second value.

In at least one example, the first value is hexadecimal value 0xE1 and the second value is hexadecimal value 0xAA.

In at least one example, the SDS includes at least 16 bytes, the first portion includes a single first byte of the SDS, the second portion includes the next twelve bytes of the SDS, and the byte number value occupies the final three bytes of the SDS.

In at least one example, the byte number value includes an ordinal number value of the number of bytes and further includes a bit-wise compliment of the ordinal number.

In at least one example, the other active link state includes a link state with more active lanes than the partial width state.

In at least one example, a state manager is provided to enter the other active state, where the other active state activates at least one additional lane of the link, and a transmitter is provided to send data on active lanes in the other active state.

In at least one example, the start of data sequence includes a partial start of data sequence (SDSp).

One or more embodiments may provide an apparatus, a system, a machine readable storage, a machine readable medium, hardware- and/or software-based logic (e.g., a lane monitor), and a method to receive a supersequence from another device. The supersequence is defined to indicate a transition from a partial width link state to another active link state. The supersequence is to be sent over one or more lanes of a link and is to include a start of data sequence (SDS) to include a predefined sequence and a byte number value. The byte number value is to indicate a number of bytes measured from a preceding control interval.

In at least one example, the control interval is a particular one of a series of control interval embedded in a link layer data stream.

In at least one example, physical layer control messages are to be sent in at least some of the control intervals and the control intervals interrupt the link layer data stream.

In at least one example, a state manager is provided to enter the other active link state based on the supersequence.

In at least one example, the supersequence is further to include an electrical ordered set and one or more training sequences.

In at least one example, at least one of the training sequences includes a fast training sequence.

In at least one example, the fast training sequence is unscrambled.

In at least one example, the training sequences includes a plurality of fast training sequences and one of the fast training sequences includes a partial fast training sequence.

In at least one example, the partial fast training sequence is to be truncated such that the SDS ends on a clean flit boundary.

In at least one example, the data pattern is to further include an electrical ordered set and a series of training sequences, and the SDS is to end the data pattern.

One or more embodiments may provide an apparatus, a system, a machine readable storage, a machine readable medium, hardware- and/or software-based logic (e.g., a lane monitor), and a method to send a request to another device to enter a low power state, receive a negative acknowledgement to the request from the other device, and identify when a pre-determined retry period has ended. The retry period is defined to restrict additional requests to the other device to enter the low power state within the retry period, and a start of the retry period is to correspond to transmission of the request.

In at least one example, the request is to be sent in a periodic control window embedded in a link layer data stream.

In at least one example, the retry period is to span at least two consecutive instances of the periodic control window.

In at least one example, the request is to be sent in a periodic control window, the negative acknowledgment is to be sent in a second periodic control window, and the retry period is to span a third and fourth periodic control window.

In at least one example, responses to requests to enter the low power state are to be sent in the periodic control window immediately subsequent to the periodic control window in which the corresponding request was sent.

In at least one example, the pre-determined retry period is timed from the requests to enter the idle state.

In at least one example, a request is sent to the other device to enter an active state within the retry period.

In at least one example, requests to enter the low power state have priority over requests to enter the active state.

One or more embodiments may provide a method, an apparatus, a system, a machine readable storage, a machine readable medium, hardware- and/or software-based logic (e.g., a lane monitor), where a link layer embeds periodic control windows in a link layer data stream and sends flits within the link layer data stream. A physical layer sends control messages within one or more of the periodic control windows, and the control messages can include a request to enter a low power state. A time delays retry of the request until expiration of a pre-determined retry period, where the retry period is to begin based on transmission of the request.

In at least one example, a receiver is provided to receive the negative acknowledgement from another device in a particular one of the control windows.

In at least one example, the low power state includes a link state of a link and the link includes a plurality of lanes.

In at least one example, each of the plurality of lanes are to be idle during the low power state.

In at least one example, the link layer and the physical layer include a layered interconnect architecture.

In at least one example, the layered interconnect architecture further includes a routing layer and a protocol layer.

In at least one example, the request is received in a particular one of the control windows and the physical layer is further to identify a particular physical layer message received in another one of the control windows subsequent to the particular control window and during the retry period.

In at least one example, the physical layer is to perform a task based on the particular physical layer message.

In at least one example, data stream is sent within a first active link state and the particular physical layer message is to include a request to enter another active link state.

In at least one example, the other active link state includes a partial width link state.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
protocol logic to send a supersequence to another device to indicate a transition from a partial width link state to another active link state, wherein the supersequence is to be sent over one or more lanes of a link and is to comprise at least a portion of a start of data sequence (SDS), the SDS is to comprise a predefined sequence and a byte number value, and the byte number value is to indicate a number of bytes measured from a preceding control interval.

2. The apparatus of claim 1, wherein the supersequence is further to comprise an electrical ordered set and one or more training sequences.

3. The apparatus of claim 2, wherein the supersequence is to end with the SDS.

4. The apparatus of claim 2, wherein the electrical ordered set is to be used to condition the lane, the one or more training sequences are to facilitate byte lock and deskewing of the lanes, and the SDS is to align with a clean flit boundary.

5. The apparatus of claim 1, wherein the predefined sequence is to comprise a first portion to comprise a first set of bytes each with a first value, and a second portion to comprise a second set of bytes each with a different second value.

6. The apparatus of claim 5, wherein the first value is hexadecimal value 0xE1 and the second value is hexadecimal value 0xAA.

7. The apparatus of claim 6, wherein the SDS comprises at least 16 bytes, the first portion comprises a single first byte of the SDS, the second portion comprises the next twelve bytes of the SDS, and the byte number value occupies the final three bytes of the SDS.

8. The apparatus of claim 1, wherein the byte number value comprises an ordinal number value of the number of bytes and further comprises a bit-wise compliment of the ordinal number.

9. The apparatus of claim 1, wherein the other active link state comprises a link state with more active lanes than the partial width state.

10. The apparatus of claim 1, further comprising:
a state manager to enter the other active state, wherein the other active state activates at least one additional lane of the link; and
a transmitter to send data on active lanes in the other active state.

11. The apparatus of claim 1, wherein the start of data sequence comprises a partial start of data sequence (SDSp).

12. An apparatus comprising:
a receiver to receive a supersequence from another device, wherein the supersequence is defined to indicate a transition from a partial width link state to another active link state, the supersequence is to be sent over one or more lanes of a link and is to comprise a start of data sequence (SDS), the SDS is to comprise a predefined sequence and a byte number value, and the byte number value is to indicate a number of bytes measured from a preceding control interval.

13. The apparatus of claim 12, wherein the control interval is a particular one of a series of control interval embedded in a link layer data stream.

14. The apparatus of claim 13, wherein physical layer control messages are to be sent in at least some of the control intervals and the control intervals interrupt the link layer data stream.

15. The apparatus of claim 12, further comprising a state manager to enter the other active link state based on the supersequence.

16. The apparatus of claim 12, wherein the supersequence is further to comprise an electrical ordered set and one or more training sequences.

17. The apparatus of claim 16, wherein at least one of the training sequences comprises a fast training sequence.

18. The apparatus of claim 17, wherein the fast training sequence is unscrambled.

19. The apparatus of claim 17, wherein the training sequences comprises a plurality of fast training sequences and one of the fast training sequences comprises a partial fast training sequence.

20. The apparatus of claim 19, wherein the partial fast training sequence is to be truncated such that the SDS ends on a clean flit boundary.

21. A non-transitory computer readable medium comprising code that, when executed, is to cause a computing device to:
send a supersequence from another device, wherein the supersequence is defined to indicate a transition from a partial width link state to another active link state, the supersequence is to be sent over one or more lanes of a link and is to comprise a start of data sequence (SDS), the SDS is to comprise a predefined sequence and a byte number value, and the byte number value is to indicate a number of bytes measured from a preceding control interval.

22. The non-transitory computer readable medium of claim 21, wherein the code, when executed, is further to cause a computing device to transition to the other active link state.

23. A system comprising:
a data link comprising a plurality of lanes;
a first device;
a second device coupled to the first device by the data link, wherein the second device is to:
send data to the first device within a first active link state, wherein at least a portion of the plurality of lanes are idle during the first active link state; and
send a data pattern to the first device to indicate a transition from the first active link state to a second active link state, wherein fewer lanes are to be idle in the second active link state than in the first active link state, the data pattern is to comprise start of data sequence (SDS), the SDS is to comprise a predefined sequence and a byte number value, and the byte number value is to indicate a number of bytes measured from a preceding control interval;
wherein the first device and second device are to transition to the second active link state based on the number of bytes.

24. The system of claim 23, wherein the data pattern is to further comprise an electrical ordered set and a series of training sequences, and the SDS is to end the data pattern.

* * * * *